(12) United States Patent
Maze et al.

(10) Patent No.: US 11,805,304 B2
(45) Date of Patent: *Oct. 31, 2023

(54) METHOD, DEVICE, AND COMPUTER PROGRAM FOR GENERATING TIMED MEDIA DATA

(71) Applicant: CANON KABUSHIKI KAISHA, Tokyo (JP)

(72) Inventors: Frédéric Maze, Langan (FR); Naël Ouedraogo, Maure de Bretagne (FR); Franck Denoual, Saint Domineuc (FR); Jonathan Taquet, Talensac (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,618

(22) Filed: Aug. 26, 2022

(65) Prior Publication Data

US 2022/0408166 A1    Dec. 22, 2022

Related U.S. Application Data

(63) Continuation of application No. 16/652,960, filed as application No. PCT/EP2018/077391 on Oct. 9, 2018, now Pat. No. 11,477,542.

(30) Foreign Application Priority Data

Oct. 12, 2017  (GB) ..................................... 1716760

(51) Int. Cl.
*H04N 21/85*  (2011.01)
*H04N 21/81*  (2011.01)
(Continued)

(52) U.S. Cl.
CPC ..... *H04N 21/8456* (2013.01); *H04N 21/8133* (2013.01); *H04N 21/8455* (2013.01); *H04N 21/85406* (2013.01)

(58) Field of Classification Search
USPC .................................. 386/239–248, 326–342
See application file for complete search history.

(56) References Cited

U.S. PATENT DOCUMENTS

2010/0153395 A1* 6/2010 Hannuksela ..... H04N 21/85406
707/E17.089
2015/0193494 A1* 7/2015 Malamal Vadakital ....................
H04N 21/85406
707/697

(Continued)

*Primary Examiner* — Hung Q Dang
(74) *Attorney, Agent, or Firm* — Canon U.S.A., Inc. IP Division

(57) ABSTRACT

There are provided a device and a method for generating timed media data, the timed media data comprising samples, the method comprising:
  obtaining samples of the time media data;
  creating tracks each comprising at least one of the obtained samples; and generating a presentation file comprising descriptive metadata associated with the created tracks,
  wherein the descriptive metadata comprise at least one track group box describing at least one group of created tracks, all the tracks belonging to a same group sharing properties,
  wherein a list of existing groups of tracks is declared in one single location in the presentation file, and
  wherein the properties shared by the tracks of a group of the list are declared at the same single location in the presentation file.

20 Claims, 15 Drawing Sheets

(51) Int. Cl.
  *H04N 21/845* (2011.01)
  *H04N 21/854* (2011.01)
  *H04N 21/4728* (2011.01)
  *H04N 21/6547* (2011.01)
  *H04N 21/84* (2011.01)
  *H04N 21/235* (2011.01)
  *H04N 21/435* (2011.01)
  *H04N 21/8543* (2011.01)

(56) References Cited

U.S. PATENT DOCUMENTS

| | | | |
|---|---|---|---|
| 2018/0213216 A1* | 7/2018 | Hwang | H04N 13/178 |
| 2018/0277164 A1* | 9/2018 | Wang | H04N 21/84 |
| 2018/0279014 A1* | 9/2018 | Chen | H04N 21/854 |
| 2018/0376152 A1* | 12/2018 | Wang | H04N 19/89 |
| 2019/0020863 A1* | 1/2019 | Wang | H04N 21/234345 |
| 2019/0306519 A1* | 10/2019 | Chen | H04N 21/85406 |
| 2019/0320190 A1* | 10/2019 | Wang | H04N 13/161 |
| 2019/0379876 A1* | 12/2019 | Hur | H04N 21/6587 |
| 2020/0107051 A1* | 4/2020 | Oh | H04N 21/43072 |
| 2020/0260063 A1* | 8/2020 | Hannuksela | H04N 21/8456 |
| 2020/0288171 A1* | 9/2020 | Hannuksela | H04N 13/243 |

* cited by examiner

METHOD, DEVICE, AND COMPUTER PROGRAM FOR GENERATING TIMED MEDIA DATA

CROSS-REFERENCE TO RELATED APPLICATIONS

This application is a continuation of U.S. patent application Ser. No. 16/652,960, filed on Apr. 1, 2020, which is the National Phase application of PCT Application No. PCT/EP2018/077391, filed on Oct. 9, 2018 and titled "METHOD DEVICE AND COMPUTER PROGRAM FOR GENERATING TIMED MEDIA DATA". This application claims the benefit under 35 U.S.C. § 119(a)-(d) of United Kingdom Patent Application No. 1716760.2, filed on Oct. 12, 2017. The above cited patent applications are incorporated herein by reference in their entirety.

FIELD OF THE INVENTION

The present disclosure generally relates to the field of encapsulation and parsing of timed media data, e.g. according to ISO Base Media File Format as defined by the MPEG standardization organization, to provide a flexible and extensible format that facilitates interchange, management, editing, and presentation of the media data and to improve stream management.

More specifically, the present invention is directed to methods and devices for generating, encapsulating and parsing timed media data.

BACKGROUND OF THE INVENTION

The invention is related to encapsulating, parsing and streaming media content, e.g. according to ISO Base Media File Format as defined by the MPEG standardization organization, to provide a flexible and extensible format that facilitates interchange, management, editing, and presentation of a group of media content and to improve its delivery for example over an IP network such as Internet using adaptive http streaming protocol.

The International Standard Organization Base Media File Format (ISO BMFF, ISO/IEC 14496-12) is a well-known flexible and extensible format that describes encoded timed media data bitstreams either for local storage or transmission via a network or via another bitstream delivery mechanism. This file format has several extensions, e.g. Part-5, ISO/IEC 14496-15 that describe encapsulation tools for various NAL (Network Abstraction Layer) unit based video encoding formats. Examples of such encoding formats are AVC (Advanced Video Coding), SVC (Scalable Video Coding), HEVC (High Efficiency Video Coding) or L-HEVC (Layered HEVC). Another example of file format extensions is ISO/IEC 23008-12 that describes encapsulation tools for still images or sequence of still images such as HEVC Still Image. This file format is object-oriented. It is composed of building blocks called boxes (or data structures characterized by a four character code) that are sequentially or hierarchically organized and that define descriptive parameters of the encoded timed media data bitstream such as timing and structure parameters. In the file format, the overall presentation over time is called a movie. The movie is described by a movie box (with four character code 'moov') at the top level of the media or presentation file. This movie box represents an initialization information container containing a set of various boxes describing the presentation. It is logically divided into tracks represented by track boxes (with four character code 'trak'). Each track (uniquely identified by a track identifier (track_ID)) represents a timed sequence of media data belonging to the presentation (frames of video, for example). Within each track, each timed unit of data is called a sample; this might be a frame of video, audio or timed metadata. Samples are implicitly numbered in sequence. The actual samples data are in boxes called Media Data Boxes (with four character code 'mdat') at same level as the movie box. The movie can also be organized temporally as a movie box containing information for the whole presentation followed by a list of couple movie fragment and Media Data box. Within a movie fragment (box with four character code 'moof') there is a set of track fragments (box with four character code 'traf'), zero or more per movie fragment. The track fragments in turn contain zero or more track run boxes ('trun'), each of which document a contiguous run of samples for that track fragment.

In the file format, a media or presentation file may also contain one or more static items (e.g. one or more still images) described within a meta box ('meta') at same level as the movie box. This meta box may contain descriptive information describing static items, this descriptive information being organized in several boxes (for instance, the list of items in an item information box ('iinf') and the location (in data boxes) of data items in an item location box ('iloc')), each item being uniquely identified by an item identifier (item_ID). The actual items data are stored either in an item data box ('idat') in the meta box or in a media data box ('mdat') at file top level.

An ISOBMFF may contain multiple encoded timed media data bitstreams or sub-parts of encoded timed media data bitstreams forming multiple tracks and/or multiple static items. ISOBMFF and its extensions comprise several grouping mechanisms to group together tracks, static items or samples. A group typically shares common semantic and/or characteristics.

For instance, ISOBMFF comprises an entity group mechanism, a track group mechanism and a sample grouping mechanism. The entity grouping mechanism can be used to indicate that tracks and/or static items are grouped according to an indicated grouping type or semantic. The track grouping mechanism can be used to indicate that tracks are grouped according to an indicated grouping type or semantic. The sample grouping mechanism can be used to indicate that certain properties associated with an indicated grouping type or semantic apply to an indicated group of samples within a track.

The inventors have noticed several problems when describing and signaling a group of components in ISOBMFF using existing grouping mechanisms, a component being either an item (e.g. still image), a track (e.g. audio, video or metadata), or a group thereof (e.g. a track group or an entity group).

For instance, a problem is that the signaling of properties associated with a given component or common to all components belonging to a group of components may generate overhead and complexity.

Another difficulty is that the properties common to a component or to a group of components are not or not very dynamic over time.

Also, another problem involves the dynamicity over time of a list of components that belong to a group of components.

Generally speaking, the existing solutions do not allow this dynamicity.

SUMMARY OF THE INVENTION

The present invention has been devised to address one or more of the foregoing concerns.

In this context, there is provided a method for generating one or more media files based on timed media data, the timed media data comprising samples, the method comprising:

obtaining the timed media data comprising the samples;

creating tracks each comprising at least a part of at least one of the obtained samples;

generating descriptive metadata associated with the created tracks; and generating the one or more media files based on the tracks and the descriptive metadata, wherein the descriptive metadata comprises at least one TrackGroupBox including at least one track group identifier and describing at least one group of the created tracks by using the at least one track group identifier, wherein the descriptive metadata further comprises a plurality of sets of properties for the created tracks, and wherein the descriptive metadata further comprises SampleToGroupBox including the at least one track group identifier associated with a group description index used for identifying a set of properties from among the plurality of sets of properties.

Optional features of the invention are further defined in the dependent appended claims.

According to embodiments, at least a part of the plurality of sets of properties is included in SampleGroupDescriptionBox in the descriptive metadata.

According to embodiments, one SampleGroupDescriptionBox is generated per track.

According to embodiments, one or more tracks corresponding to a same track group identifier are associated with the same set of properties from among the plurality of sets of properties.

According to embodiments, said single location is located at a higher level than the track level in the presentation file.

According to embodiments, the track group box indicates a grouping type associated with semantics describing at least one criterion used to form the group of tracks.

According to embodiments, the timed data are partitioned so that at least one of the time samples comprises sub-samples.

According to embodiments, at least one tracks group is a composition group comprising subsamples of the different tracks belonging to the group.

According to embodiments, the track group box indicates an identifier of the group, the identifier being unique in the presentation file.

According to embodiments, the list of existing groups of tracks and properties shared by the tracks of each group are defined at movie level in the presentation file.

According to embodiments, for at least one track, further properties specific to this track are defined at track level in the presentation file.

According to embodiments, the group definition at movie level is associated with the group definition at track level by the same unique group identifier.

According to embodiments, for at least one track, further properties specific to this track are defined at said same single location in the presentation file.

According to embodiments, properties specific to said one track are directly defined in the list of existing groups of tracks.

According to embodiments, each property can take different values, and the value of each property specific to a track varies over time.

According to embodiments, the value of each property specific to the track is defined for one or more samples within said track.

According to embodiments, the descriptive metadata further comprise at least one box describing the samples within the tracks belonging to the same group of tracks, the at least one box defining the different possible values that can take the specific properties over time.

According to embodiments, the at least one box indicates a grouping type associated with semantics describing at least one criterion used to form a group of samples.

According to embodiments, the values taken by the properties of consecutive samples follow a repeated pattern and the at least one box defines the repeated pattern itself and its repetition.

According to embodiments, each property can take different values, and the presentation file is fragmented so that the at least one group of tracks is defined at fragment level, and the set of tracks composing a group of tracks varies over time.

According to embodiments, the track group box comprises a flag indicating whether the definition of the at least one group of tracks can vary or not over time.

According to embodiments, the definition of the at least one group of tracks includes: the properties shared by the tracks of the group, the values that can take each property, and/or the tracks composing the group.

According to a second aspect of the invention, there is provided a device for generating one or more media files based on timed media data, the timed media data comprising samples, the device being configured for:

obtaining the timed media data comprising the samples;

creating tracks each comprising at least a part of at least one of the obtained samples;

generating descriptive metadata associated with the created tracks; and generating the one or more media files based on the tracks and the descriptive metadata, wherein the descriptive metadata comprises at least one TrackGroupBox including at least one track group identifier and describing at least one group of the created tracks by using the at least one track group identifier, wherein the descriptive metadata further comprises a plurality of sets of properties for the created tracks, and wherein the descriptive metadata further comprises SampleToGroupBox including the at least one track group identifier associated with a group description index used for identifying a set of properties from among the plurality of sets of properties.

According to embodiments, each property can take different values, and the value of each property specific to a track varies over time.

According to embodiments, each property can take different values, and the presentation file is fragmented so that the at least one group of tracks is defined at fragment level, and the set of tracks composing a group of tracks varies over time.

According to embodiments, the track group box comprises a flag indicating whether the definition of the at least one group of tracks can vary or not over time.

The second aspect of the present invention has features and advantages similar to the first above-mentioned aspect.

Since the present invention may be implemented in software, the present invention may be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which.

DETAILED DESCRIPTION OF EMBODIMENTS OF THE INVENTION

In the following description, a movie is temporally partitioned into several parts, each part being referred to as a "fragment". Each fragment is included in one or more tracks, with associated descriptive metadata. Therefore, a fragment can be seen as a track portion.

In practice, in an ISOBMFF file, metadata are included in a movie box ('moov') and the bitstream is included in a media data box ('mdat'). The movie box can comprise the description of several tracks (for instance an audio track and a video track).

The use of fragments allows media data to be fragmented into several parts. One fragment is represented by a pair of movie fragment box ('moof) and media data box ('mdat'), the movie fragment box describing the content of the associated media data box.

Thus, in a fragmented ISOBMFF file, there will be a succession of box 'moov', 'moof' and 'mdat', 'moof' and 'mdat', 'moof' and 'mdat', etc. The first box 'moov' comprises data common to the whole ISOBMFF file.

In the following description, the equivalent of a track ('trak') for a fragmented ISOBMFF file is a 'traf'.

In the context of the present invention, tracks may be grouped according to common properties, i.e. properties that all the tracks of the group present. Each track may, in addition, have other properties which are specific to it, i.e. which is not shared with all the tracks of its group.

According to a first embodiment, the presentation file comprises at least one track group box describing groups of tracks where all the tracks belonging to a same group share common properties. The list of existing groups of tracks is declared in one single location in the presentation file, and the common properties shared by the tracks of a group are also declared at this same single location in the presentation file.

According to a second embodiment, properties specific to a track (i.e. not shared by all the tracks of a group) take different values over time.

According to a third embodiment, the set of tracks composing a group of tracks varies over time.

According to a fourth embodiment, the track group box comprises a flag indicating whether the definition of the at least one group of tracks can vary or not over time. This definition may vary in terms of properties shared by the tracks of the group (i.e. grouping criterion), in terms of values that can take each property (specific to each track or common to all the tracks of the group), and/or in terms of the tracks composing the group.

Figure 1:
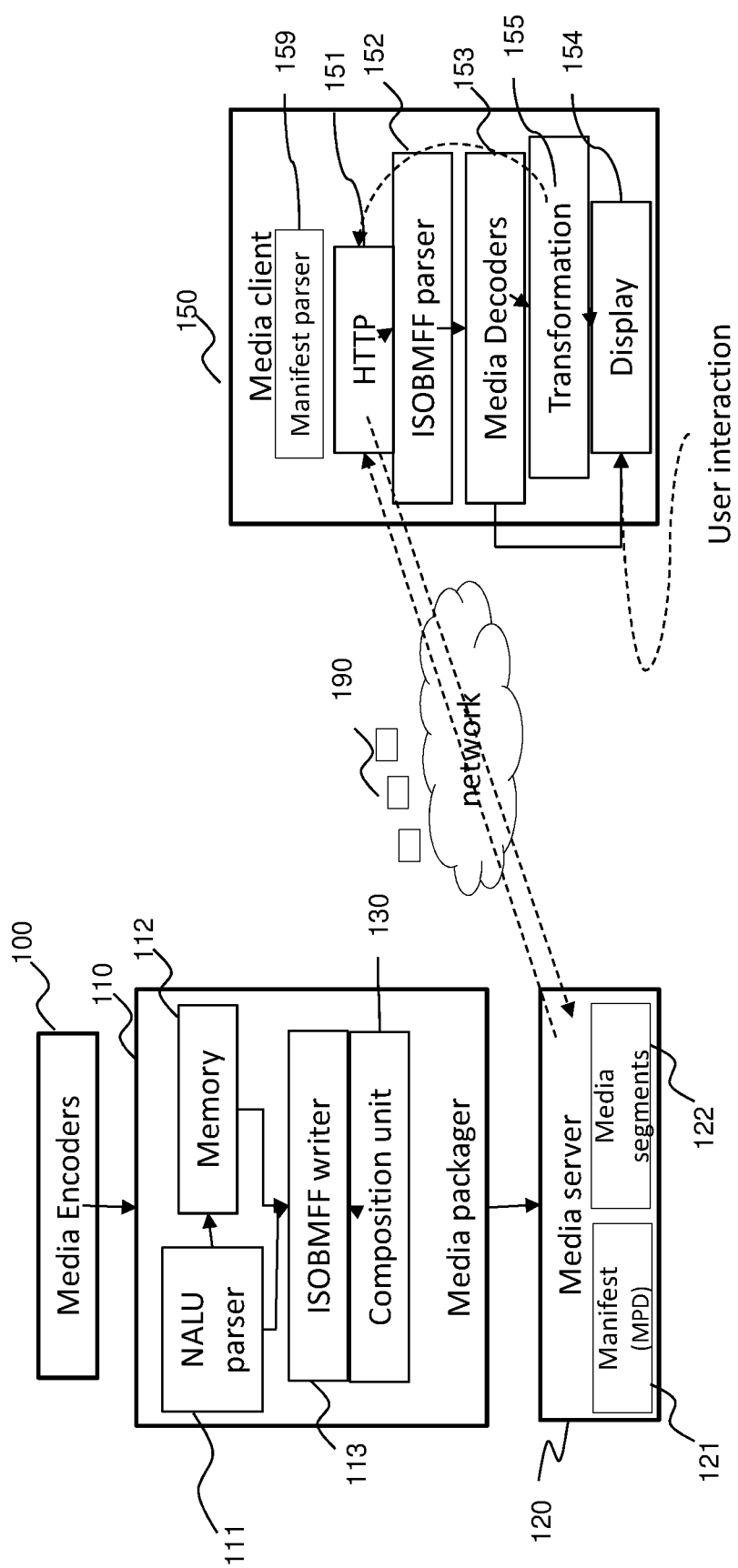
FIG. 1 illustrates a typical client server system in which the embodiments of the invention may be used.

FIG. 1 illustrates a typical client server system in which the invention may be used. The invention is not restricted to such system as it may concern the generation of media files that may be distributed in any way, not only by streaming over a communication network.

The system comprises at a server side: media encoders 100, in particular a video encoder, a media packager 110 and a media server 120. The media packager 110 comprises a NALU parser 111, a memory 112 and an ISOBMFF (ISOBMFF) writer 113. The media server 120 can generate a manifest file (also known as a Media Presentation Description (MPD) file)) 121 and media segments 122. The system further comprises at client side a media client 150 with different modules: an ISOMBFF parser 152, media decoders 153 in particular a video decoder, a display 154 and a HTTP client 151 that supports adaptive HTTP streaming, in particular parsing of streaming manifest 159 to control the streaming of media segments 190. It also contains a module capable of performing operations on encoded bitstreams and/or decoded picture: the transformation module 155.

Typically, the media client 150 requests the manifest file 121 in order to get the description of the different media representations available on the media server 120 that compose a media presentation. Accordingly, the media client 150 then requests the media segments 122 it is interested in. These requests are done via the HTTP module 151. The received media segments are then parsed by the ISOBMFF parser 152, decoded by the video decoder 153, optionally transformed through the transformation unit 155 to be played on the display 154.

A video sequence is typically encoded by the video encoder 100 to be encapsulated into one or several files by the media packager 110. The generated files are made available to clients by the Media server 120.

According to some embodiments of the invention, another module is included in the system as part of the media packager or outside the media packager: the generation unit 130. This unit allows a user to watch the encapsulated media tracks and to edit and modify them by applying various image operations onto the samples. This generation unit interacts with the media packager when the user wants to insert the result of his composition as an additional track in the media file produced by the ISOBMFF Writer.

The media server is optional in the sense that the invention mainly deals with the media encapsulation and construction/description of tracks resulting from composition, derivation, combination, transformation or aggregation of one or more media tracks. As for the media server, the transmission part (HTTP module and manifest parser) is optional in the sense that the invention also applies for a media client consisting in a simple media player to which the encapsulated media file is provided for rendering. The media file can be provided by full download, by progressive download, by adaptive streaming or just by reading the media file on a disk or from a memory.

Figure 3:
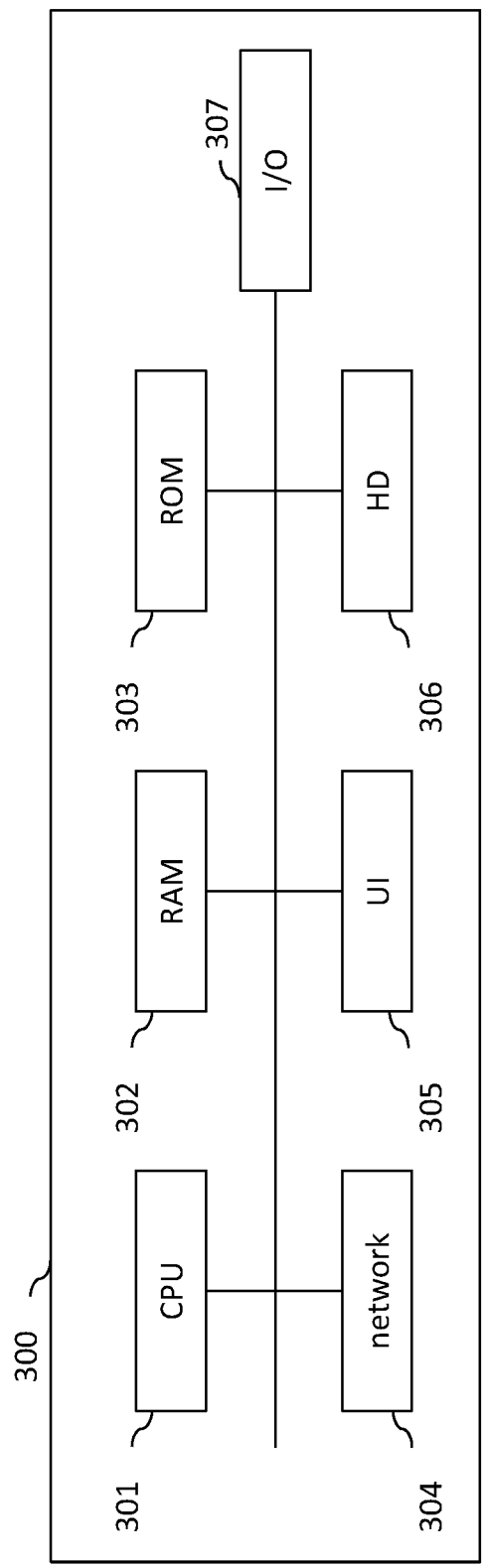
FIG. 3 is a schematic block diagram of a computing device for implementation of one or more embodiments of the invention.

The method according to the invention is performed by the media packager module 110, and more specifically by the ISOBMFF writer module 113 in cooperation with the composition unit 130, comprising software code, when executed by CPU 301 of server apparatus as illustrated in FIG. 3.

Typically, the encapsulation module is in charge of reading high-level syntax of encoded timed media data bitstream, e.g. composed of compressed video, audio or metadata, to extract and identify the different elementary units of the bitstream (e.g. NALUs from a video bitstream) and organize encoded data in an ISOBMFF file or ISOBMFF segments 122 containing the encoded video bitstream as one or more tracks with descriptive metadata according to the ISOBMFF box hierarchy.

According to particular embodiments, encoded timed media data bitstreams are encapsulated into a file or into small temporal segment files according to an encapsulation file format, for instance ISO Base Media File Format (ISO/IEC 14496-12 and ISO/IEC 14496-15), Omnidirectional MediA Format (OMAF) (ISO/IEC 23090-2) and associated specifications, and possibly with one or more still image bitstreams according to the Image File Format (ISO/IEC 23008-12) as defined by the MPEG standardization organization.

An encoded bitstream (e.g. HEVC, AVC) and possibly its sub-bitstreams (e.g. tiled HEVC, MV-HEVC, scalable HEVC), can be encapsulated as one single track. Alternatively multiple encoded bitstreams that are spatially related (i.e. are sub-spatial parts of a panorama image) can be encapsulated as several sub-picture tracks. Alternatively, an encoded bitstream (e.g. tiled HEVC, MV-HEVC, scalable HEVC) comprising several sub-bitstreams (tiles, views, layers) can be encapsulated as multiple sub-picture tracks.

A sub-picture track is a track embedding data for a sub part of a picture or image. A sub-picture track may be related to other sub-picture tracks or to the track describing the full picture (also known as panorama picture) the sub-picture is extracted from. For example a sub-picture track can be a tile track. It can be represented by an AVC track, an HEVC track, an HEVC tile track or any compressed video bitstream encapsulated as a sequence of samples.

A tile track is a sequence of timed video samples corresponding to a spatial part of an image or to a sub-picture of an image or picture. It can be for example a region of interest in an image or an arbitrary region in the image. The data corresponding to a tile track can come from a video bitstream or can come from a sub part of a video bitstream. For example a tile track can be an AVC or HEVC compliant bitstream or can be a sub-part of AVC or HEVC or any encoded bitstream, like for example HEVC tiles. In a preferred embodiment a tile track is independently decodable (encoder took care to remove motion prediction from other tiles). When a tile track corresponds to a video bitstream encoded in HEVC with tiles, it can be encapsulated into an HEVC Tile track denoted as 'hvt1' track as described in ISO/IEC 14496-15 4th edition. It can then refer to a tile base track to obtain parameter sets, high level information to set up the video decoder. The tile track can also be encapsulated into an independently decodable HEVC track 'hvc1' or 'hev1' track by including and repeating in each tile track the parameter sets (also known as system tiles). A tile track can be used for spatial composition of sub-pictures into a bigger image or picture.

A tile base track is a track common to one or more tile tracks that contain data or metadata that is shared among these one or more tracks. A tile base track may contain instructions to compose images from one or more tile tracks. Tile tracks may depend on a tile base track for complete decoding or rendering. When a tile base track derives from a video bitstream encoded in HEVC with tiles, it is encapsulated into an HEVC track denoted as 'hvc2' or 'hev2' track. In addition it is referenced by HEVC tile tracks via a track reference 'tbas' and it shall indicate the tile ordering using a 'sabt' track reference to the HEVC tile tracks as described in ISO/IEC 14496-15 4th edition.

A composite track (also denoted reference track) is a track that refers to other tracks to compose an image. One example of composite track is, in case of video tracks, a track composing sub-picture tracks into a bigger image. This can be done by post-decoding operation, for example in a track deriving from video tracks that provides transformation and transformation parameters to compose the images from each video track to a bigger image. A composite track can also be a track with extractor NAL units providing instructions to extract NAL units from other video tracks or tile tracks to form before decoding a bitstream resulting from sub-bitstream concatenation. A composite track can also be a track that implicitly provides composition instructions, for example through track references to other tracks.

Figure 2A:
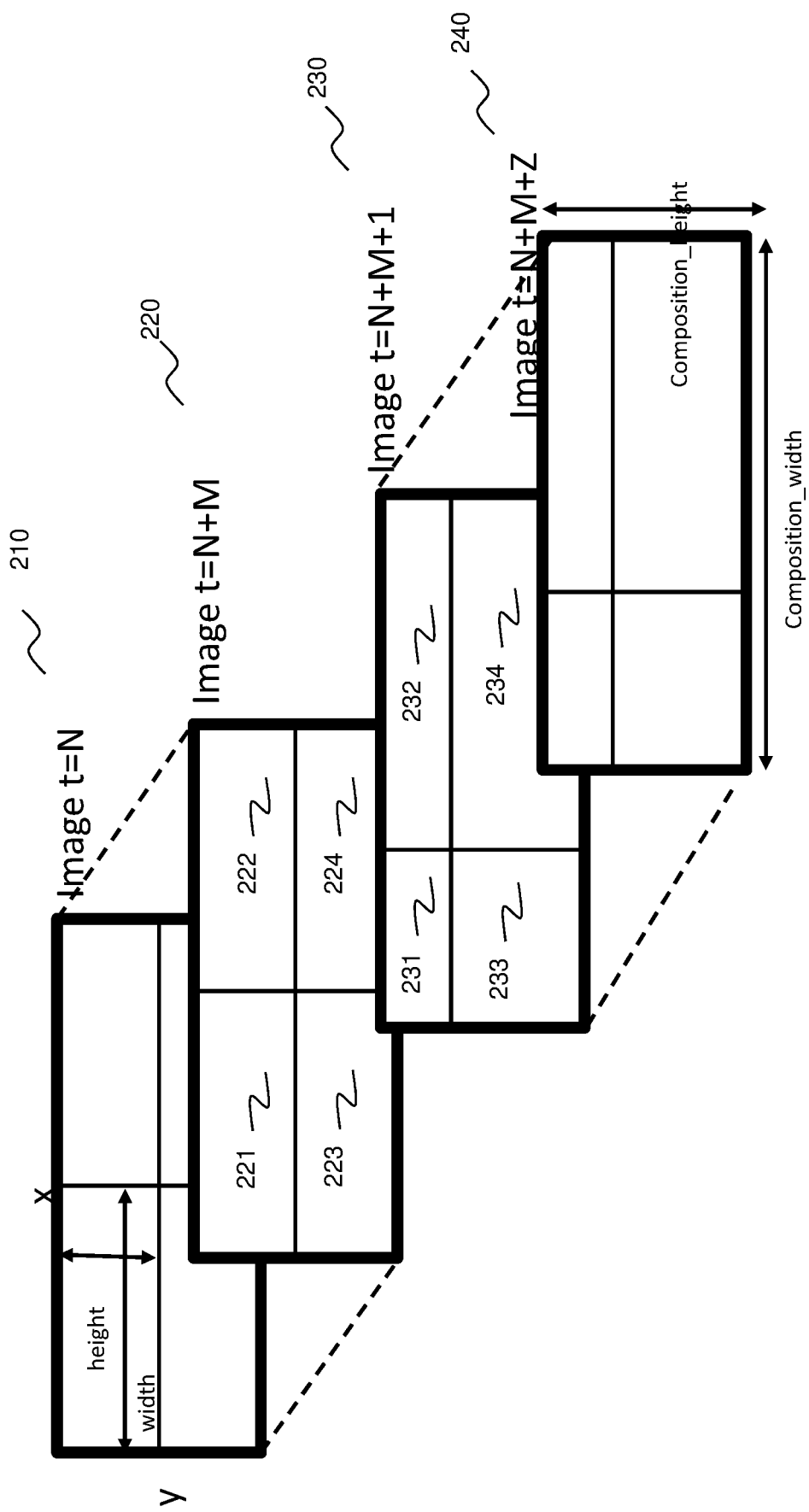
FIG. 2a illustrates a first scenario in which embodiments of the invention may be used.

FIG. 2a illustrates a first scenario where the partition of an image (denoted full image) into several sub-spatial parts may vary over time according to an embodiment of the invention. For instance, images 210, 220, 230 and 240 represent the same full image at different temporal instants. For instance, from time t=N, image 210, to time t=N+M, image 220, the partition grid may be equally divided between four sub-pictures 221, 222, 223, 224, all sub-pictures, having the same height and width sizes. Then from time t=N+M+1, image 230 to time t=N+M+Z, image 240, the partition grid and sizes of each sub-picture 221, 222, 223 and 224, are changed to obtain the new sub-pictures respectively 231, 232, 233 and 234 while the size of the composition picture (indicated by composition_height and composition_width) remains the same. In this scenario, the composition picture is the full image. Each corresponding sub-picture over time (e.g. 221 and 231) forms a sub-picture track for which spatial properties (e.g. spatial coordinates: horizontal and vertical positions of the upper left corner (x, y), width and height) may vary at some temporal instants.

Figure 2B:
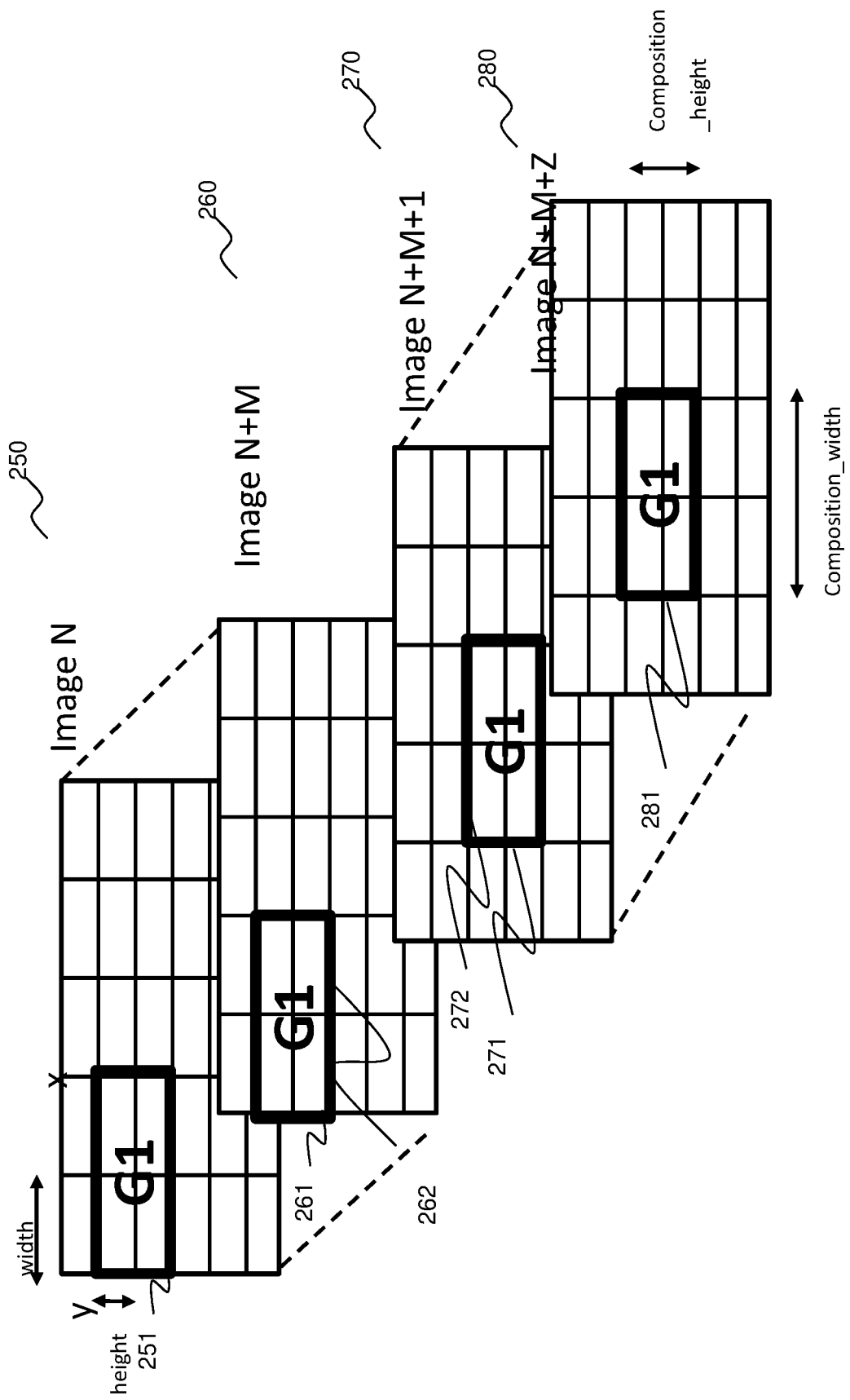
FIG. 2b illustrates a second scenario in which embodiments of the invention may be used.

FIG. 2b illustrates a second scenario where the partition grid of an image (full image), denoted over different temporal instants 250, 260, 270, 280, is not varying over time. However, on contrary, the list of sub-pictures composing a given group of sub-pictures denoted G1 is varying over time. For instance, from time t=N, image 250, to time t=N+M, image 260, a group of sub-pictures G1 251, 261, 271, 281 is composed of sub-pictures at the intersection of first and second columns with second and third rows. Then from time t=N+M+1, image 270 to time t=N+M+Z, image 280, the list of sub-pictures composing the group becomes the sub-pictures at the intersection of second and third columns with third and fourth rows. In this FIG. 2b, composition_height and composition_width indicate the size of the composition picture G1 that represents a sub-picture composition within the full image. Each corresponding sub-picture over time (e.g. at second column and third row 262 and 272) forms a sub-picture track for which spatial properties (horizontal and vertical positions of the upper left corner (x, y), width and height) do not change over time in the scope of the full image, but are varying in the scope of the group of sub-pictures G1. Similarly, in this scenario, the spatial properties (x, y, width and height) of the group of sub-picture G1 may be varying in the scope of the full image 250, 260, 270, 280.

Respective sizes of sub-pictures and composition pictures may be expressed for instance in luma pixels or in normalized coordinates.

In a third scenario, both the partition grid and the list of sub-pictures composing a group of sub-pictures may also vary over time simultaneously.

The present invention has been devised to address one or more of the foregoing scenarios.

ISO/IEC 14496-12 provides a box 'trgr' located at track level (i.e. within the 'trak' box in ISOBMFF box hierarchy) to describe groups of tracks, where each group shares a particular characteristic or the tracks within a group have a particular relationship. This track group box is an empty container defined as follows:

```
Box Type: 'trgr'
Container:TrackBox ('trak')
Mandatory: No
Quantity: Zero or one
aligned (8) class TrackGroupBox extends Box('trgr') {
}
```

This track group box can contain a set of track group type boxes defined as follows:

```
aligned(8) class TrackGroupTypeBox (unsigned int(32) track_group_type)
    extends FullBox (track_group_type, version = 0, flags = 0)
{
  unsigned int (32) track_group_id;
  // the remaining data may be specified for a particular track_group_type
}
```

The particular characteristic or the relationship declared by an instance of this track group type box is indicated by the box type (track_group_type). This box also includes an identifier (track_group_id), which can be used to determine the tracks belonging to the same track group. All the tracks having a track group box with a track_group_type box having the same track_group_type and track_group_id values are part of the same track group. The box also allows declaration of specific parameters associated with the track for a particular track_group_type. For instance, the MPEG OMAF standard (ISO/IEC 23090-2) defines a specific track group for spatial composition as a TrackGroupTypeBox of type 'spco' as defined below:

```
aligned (8) class SubPictureCompositionBox extends
TrackGroupTypeBox ('spco') {
  SubPictureRegionBox ( ) ;
  // optional boxes
}
aligned (8) class SubPictureRegionBox extends
FullBox('sprg', 0, 0) {
  unsigned int (16) track_x;
  unsigned int (16) track_y;
  unsigned int (16) track_width;
  unsigned int (16) track_height;
```

-continued

```
  unsigned int (16) composition_width;
  unsigned int (16) compostion_height;
}
```

Where track_x, track_y are the coordinates of the track within the spatial composition, track_width and track_height define the size in luma pixels of the track within the spatial composition and composition_width and composition_height indicate the size in luma pixels of the overall spatial composition.

The samples of each track in an 'spco' track group can be spatially composed with samples (at the same composition or decoding time) from other tracks in this same group to produce a bigger image.

Another example of track grouping is the signaling of pair of tracks that composes stereoscopic media content, for instance the TrackGroupTypeBox of type 'ster' as defined below:

```
aligned (8) class StereoVideoGroupBox extends
TrackGroupTypeBox ('ster') {
  unsigned int (1) left_view_flag;
  bit (31) reserved = 0;
}
```

Where left_view_flag signals which track is the left (value 1) or right (value 0) view.

Describing groups of tracks as described above presents several drawbacks:

The player must parse all track group boxes associated with all tracks in a presentation before being able to know which the existing groups of tracks are and which track belongs to which group of tracks. This is not the most efficient process if the player wants to play only tracks belonging to a given group.

Parameters or properties that are common to all tracks belonging to a same group must be repeated in the corresponding track group type box in all tracks that compose the group. This creates useless data redundancy.

As track group boxes are defined at track level in a movie box (with four character code 'moov') located at the top level of the media or presentation file, this information is static for the whole presentation and parameters or properties (e.g. track_x, track_y, track_width and track_width in a 'spco' track group) associated with a given track in a given group cannot change over time.

According to a first embodiment, the list of existing groups of tracks is declared in one single location at higher level of the media or presentation file and group parameters or properties common to all tracks composing a group of tracks are declared in this same single location instead of repeating them in all tracks.

This embodiment may rely on the entity group mechanism as defined in ISO/IEC 14496-12:2015 Amd2. An empty container box (Groups List box ('grpl')) located in a file-level Meta Box ('meta') can contain a list of group description boxes called EntityToGroupBox as defined below:

Box Type: 'grpl'
Container:MetaBox that is not contained in

-continued

```
AdditionalMetadataContainerBox
Mandatory: No
Quantity: Zero or One
aligned(8) class GroupsListBox extends Box('grpl') {
}
Box Type:As specified below with the grouping_type value for the
EntityToGroupBox
Container:GroupsListBox
Mandatory: No
Quantity: One or more
aligned(8) class EntityToGroupBox(grouping_type,
version, flags)
extends FullBox(grouping_type, version, flags) {
   unsigned int(32) group_id;
   unsigned int(32) num_entities_in_group;
   for(i=0; i<num_entities_in_group; i++)
      unsigned int(32) entity_id;
// the remaining data may be specified for a particular
grouping_type
}
```

Where the box type (grouping_type) indicates the grouping type of the entity group (or component group). An entity is equivalent to a component as previously described.

In an alternative this empty container box (Groups List box ('grpl')) can be defined in a file-level Movie Box ('moov') or file-level Meta Box ('meta') if there is no Movie box.

Similarly to the track_group_type in TrackGroupType-Box, each grouping_type code is associated with semantics describing the grouping.

group_id is a unique identifier in the scope of the whole presentation and it shall not be equal to any group_id value of any other EntityToGroupBox, any item_ID value of the hierarchy level (file, movie, or track) that contains the GroupsListBox, or any track_ID value (when the GroupsListBox is contained in the file level).

num_entities_in group specifies the number of component identifier values (i.e. item_ID, track_ID, group of components identifiers (e.g. group_id, track group_id)) mapped to this entity group.

entity_id corresponds to:

an item, when an item with item_ID equal to entity_id is present in the hierarchy level (file, movie or track) that contains the GroupsListBox, or a track, when a track with track_ID equal to entity_id is present and the GroupsListBox is contained in the file level, or a group of components, when a EntityToGroupBox with same grouping_type and with group_id equal to entity_id or a TrackGroupTypeBox with track_group_type equal to grouping_type and with track_group_id equal to entity_id is present and the GroupsListBox is contained in the file level.

Thus a specific spatial composition group of type 'spco' is defined at two different levels by associating an EntityToGroupBox with TrackGroupTypeBoxes when both EntityToGroupBox@grouping_type equal TrackGroupTypeBox@track_group_type and EntityToGroupBox@group_id SqualTrackGroupTypeBox@track_group_id.

First, at movie level the dedicated EntityToGroupBox of type 'spco' (called SubPictureCompositionGroupBox) is defined in a GroupsListBox as follows:

```
aligned(8) class SubPictureCompositionGroupBox
   extends EntityToGroupBox ('spco') {
      SubPictureCompositionRegionBox;
      // optional boxes
}
aligned(8) class SubPictureCompositionRegionBox extends
FullBox('scrg',0,0) {
   unsigned int(16) composition_width;
   unsigned int(16) composition_height;
}
```

The list of tracks composing this spatial composition group is then provided using the list of entity_id of the EntityToGroupBox. The properties common to all tracks in this group are mutualized and defined once by defining a new SubPictureCompositionRegionBox in the SubPictureCompositionGroupBox.

composition_width and composition_height provide the size of the composition in luma pixels.

Second, at track level a track group with a TrackGroupTypeBox of type 'spco' (called SubPictureCompositionBox) is defined in all tracks composing the same spatial group as defined below:

```
aligned(8) class SubPictureCompositionBox extends
TrackGroupTypeBox('spco') {
   SubPictureRegionBox();
   // optional boxes
}
aligned(8) class SubPictureRegionBox extends
FullBox('sprg',0,0) {
   unsigned int(16) track_x;
   unsigned int(16) track_y;
   unsigned int(16) track_width;
   unsigned int(16) track_height;
}
```

Third, the group definition at movie level and at track level are associated by defining the same group identifier (i.e. a same group is defined by its couple grouping_type/group_id for EntityToGroupBox or track_group_type/track_group_id for a TrackGroupTypeBox). For instance, for the spatial composition group, when the parameter SubPictureCompositionBox@track_group_id equals to the SubPictureCompositionGroupBox@group_id and SubPictureCompositionBox@track_group_type equals to SubPictureCompositionGroupBox@grouping_type, both structures belong to the same group.

As an alternative to the previous example, rather than combining an existing box at movie level (e.g. EntityToGroupBox) with an existing box at track level (e.g. TrackGroupTypeBox), it is also possible to define a new EntityToGroupBox box (e.g. ComponentToGroupBox) that contains all information related to a group of components in one single place. The set of group of components is contained in an empty container box (e.g. Groups List box ('grpl')) located in a high-level Box (e.g. 'moov', 'moof', or 'meta' at either file-level, movie-level or movie-fragment-level, or also 'udta'). The ComponentToGroupBox contains the list of components (item, track, group of components) that compose the group of components, the properties associated with the group shared by all members of the group, and for each member, the properties specific to this member within the group of components. The ComponentToGroupBox can be defined as a class GroupOfComponents as follows:

```
class GroupOfComponents {
  groupOfComponent_type;
  group_id;
  num_component_in_sets;
  for(0 to num_component_in_sets) {
    referenceToComponent();
    optionalComponentProperties();
  }
  optionalGroupOfComponentproperties();
}
```

Where groupOfComponent_type is the type that characterizes the group of components, group_id is a unique identifier of the group in the scope of the presentation, num_component_in_sets is the number of components in the group (e.g. number of tracks in the group), referenceToComponent ( ) is an information to identify a component belonging to the group (e.g. component's unique identifier), optionalComponentProperties ( ) are optional properties of the component in the group and optionalGroupOfComponentProperties ( ) are optional properties shared by all components of the group.

The ComponentToGroupBox can also be defined according to ISOBMFF syntax as follows:

```
      Box Type:As specified below with the grouping_type value for the
ComponentToGroupBox
Container: GroupsListBox
Mandatory: No
Quantity: One or more
      aligned(8) class ComponentToGroupBox (grouping_type, version,
flags)
extends FullBox(grouping_type, version, flags) {
  unsigned int(32) group_id;
  unsigned int(32) num_components_in_group;
  for(i=0; i<num_components_in_group; i++)
  {
    ComponentInComponentToGroupBox(grouping_type);
  }
// the remaining data may be specified for a particular grouping_type
}
      aligned(8) class ComponentInComponentToGroupBox (unsigned
      int(32) grouping_type)
          extends FullBox(grouping_type, version = 0, flags =
          0)
      {
        unsigned int(32) component_id;
        // the remaining data may be specified for a particular
        grouping _type
      }
```

Where the box type (grouping_type) indicates the type of grouping of the group of components.

group_id and component_id are unique identifiers respectively of the group and of the components that belong to the group in the scope of the whole presentation. group_id shall not be equal to any group_id value of any other ComponentToGroupBox, any item_ID value of the hierarchy level (file, movie, or track) that contains the GroupsListBox, or any track_ID value (when the GroupsListBox is contained in the file level).

component_id corresponds to:
an item, when an item with item_ID equal to component_id is present in the hierarchy level (file, movie or track) that contains the GroupsListBox, or
a track, when a track with track_ID equal to component_id is present and the GroupsListBox is contained in the file level, or
a group of components, when a ComponentToGroupBox with same grouping_type and with group_id equal to component_id is present and the GroupsListBox is contained in the file level.

The ComponentInComponentToGroupBox allows defining optional specific parameters associated with a given component (identified by component_id) for a group of type grouping_type. The values of these specific parameters apply in the scope of the embedding group with identifier group_id and type grouping_type.

Similarly the Component ToGroupBox allows defining optional parameters associated with a group of type grouping_type that are shared by all components belonging to this group.

For instance, a group declaring stereoscopic video pair can be described as follows:

```
aligned(8) class ComponentToGroupBox ('ster', version, flags)
extends FullBox ('ster', version, flags) {
  unsigned int(32) group_id;
  unsigned int(32) num_entities_in_group;
  for(i=0; i<num_entities_in_group; i++)
  {
    ComponentInComponentToGroupBox('ster');
  }
}
aligned(8) class ComponentInComponentToGroupBox ('ster')
        extends FullBox('ster', version = 0, flags = 0)
{
  unsigned int(32) component_id;
  unsigned int(8) component_is_left;
}
```

Where the property component_is_left is associated with each component belonging to a group of components of type 'ster' to signal if the component is the left or right view.

In another alternative, the ComponentToGroupBox can be defined according to ISOBMFF syntax as follows:

```
Box Type: As specified below with the grouping_type value for the
ComponentToGroupBox
Container:GroupsListBox
Mandatory: No
Quantity: One or more
aligned(8) class ComponentToGroupBox (grouping_type, version,
flags)
extends FullBox(grouping_type, version, flags) {
  unsigned int(32) group_id;
  PropertycontainerBox property_container;
  unsigned int(32) num_components_in_group;
  for(i=0; i<num_components_in_group; i++)
  {
    unsigned int(32) component_id;
    unsigned int(8) association_count;
    for (i=0; i<association_count; i++) {
      bit(1) essential;
      if (flags & 1)
        unsigned int(15) property index;
      else
        unsigned int(7) property index;
    }
  }
  unsigned int(8) num_common_properties_in_group;
  for (i=0; i< num_common_properties_in_group; i++) {
    bit(1) essential;
    if (flags & 1)
      unsigned int(15) common_property_index;
    else
      unsigned int(7) common_property_index;
  }
}
```

Where:

group_id is the unique identifier for the group of type grouping_type in the scope of the whole presentation.

property container contains all instances of common and component-specific properties definitions associated with the group of type grouping_type. This PropertyContainerBox contains an implicitly indexed list of properties.

num_components_in_group is the number of components that belong to this group of components.

component_id is the unique identifier of the components that belong to the group in the scope of the whole presentation.

association_count is the number of properties associated with a given component (component_id) in the group.

essential when set to 1 indicates that the associated property is essential to the component or group, otherwise it is non-essential.

property_index is either 0 indicating that no property is associated (the essential indicator shall also be 0), or is the 1-based index of the associated property box in the PropertyContainerBox contained in the same ComponentToGroupBox.

num_common_properties_in_group is the number of common or shared properties associated with the group.

common_property_index is either 0 indicating that no property is associated (the essential indicator shall also be 0), or is the 1-based index of the associated property box in the PropertyContainerBox contained in the same ComponentToGroupBox.

According to this alternative of the ComponentToGroupBox, the PropertyContainerBox and embedded properties are defined as follows:

```
aligned(8) class Componentproperty(property_type)
    extends Box(property_type)
{
}
aligned(8) class ComponentFullProperty(property_type,
version, flags)
    extends FullBox(property_type, version, flags)
{
}
aligned(8) class PropertyContainerBox
    extends Box('ppco')
{
    properties Property() [];
}
```

Where Property boxes derive from ComponentProperty or ComponentFullProperty to fill box.

By either defining rules to combine EntityToGroupBox and TrackGroupTypeBox, or defining a new grouping box ComponentToGroupBox containing the group definition, common group properties and component properties within the given group as described above, it is then possible to declare the list of all existing groups at movie level possibly without having to parse all tracks and to mutualize common properties within a group of tracks at a single location without redundancy.

According to a second embodiment, the entity group mechanism and the track group mechanism are combined as described in the previous embodiment and in addition a sample grouping mechanism is used to allow the properties associated with a track within a group of tracks to vary over time.

The sample grouping mechanism allows certain properties corresponding to an indicated grouping_type to be associated with a group of samples within a track.

This mechanism relies on the use of two boxes:
- a SampleToGroup box ('sbgp') that describes the assignment of samples to sample groups and
- a SampleGroupDescription box ('sgpd') that describes common properties of samples within a particular sample group. The SampleGroupDescription box ('sgpd') contains a list of SampleGroupEntry (VisualSampleGroupEntry for video content), each instance of SampleGroupEntry providing different values for the common properties defined for a particular sample group (identified by its 'grouping_type').

A particular type of sample grouping is defined by the combination of one SampleToGroup box and one SampleGroupDescription box via a type field ('grouping_type').

Multiple sample grouping instances (i.e. pair of SampleToGroup and SampleGroupDescription boxes) may exist based on different grouping criteria.

The SampleToGroup box is defined as follows:

```
Box Type: 'sbgp'
Container:SampleTableBox('stbl') or TrackFragmentBox('traf')
Mandatory: No
Quantity: Zero or One
aligned (8) class SampleToGroupBox
    extends FullBox('sbgp', version, 0)
{
    unsigned int(32) grouping_type;
    if (version == 1) {
        unsigned int(32) grouping_type_parameter;
    }
    unsigned int(32) entry_count;
    for (i=1; i <= entry_count; i++)
    {
        unsigned int(32) sample_count;
        unsigned int(32) group_description_index;
    }
}
```

Where grouping_type identifies the type (i.e. the criterion used to form the sample groups) of the sample grouping and links it to its sample group description table with the same value for grouping_type.

sample_count indicates the number of consecutive samples associated with a sample group entry in this group.

group_description_index gives the index of the sample group entry which describes the samples in this group.

In some cases, consecutive samples in sample grouping may follow some repeated patterns, for instance, an Intra frame I followed by N inter-frames P repeatedly, e.g., IPPPIPPP.

In such a case, it may be desirable to use a more compact SampleToGroup box based on the pattern where it is listed as a sample count, and pattern repetition.

Thus, an alternative to the SampleToGroup box, more compact, is defined as follows:

```
Box Type: 'csgp'
Container:SampleTableBox('stbl') or TrackFragmentBox('traf')
Mandatory: No
Quantity: Zero or One
aligned(8) class CompactSampleToGroupBox
    extends FullBox('csgp', version, flags)
{
    unsigned int(32) grouping_type;
    if (flags & 1)
        unsigned int(32) grouping_type_parameter;
    unsigned int(2) field_size;
    unsigned int(2) repeat_count_size;
    unsigned int(1) last_pattern_is_last_only;
    unsigned int(3) reserved;
```

```
unsigned int(repeat_count_size) repeat_count;
//till end of box
[
    unsigned int(8) sample_count_minus_one;
    unsigned int(1) is_traf_sgpd;
    unsigned int(field_size) sample_group_description_index;
]//nb_patterns
}
```

Where:

grouping_type is an integer that identifies the type (i.e. criterion used to form the sample groups) of the sample grouping and links it to its sample group description table with the same value for grouping_type. At most one occurrence of this box with the same value for grouping_type (and, if used, grouping_type parameter) shall exist for a track.

grouping_type parameter is an indication of the sub-type of the grouping. This parameter is optional and is only present when flags & 1=1.

field_size is an integer value indicating the number of bits used to encode sample group_description_index field. A value of 0 means the index is coded on 7 bits, a value of 1 means the index is coded on 15 bits, a value of 2 means the index is coded on 23 bits and a value of 3 means the index is coded on 31 bits.

repeat_count_size is an integer value indicating the number of bits used to encode repeat_count field. A value of 0 means the repeat count is not coded (0 bits, pattern is not repeated), a value of 1 means the repeat count is coded on 8 bits, a value of 2 means the repeat count is coded on 24 bits and a value of 3 means the repeat count is coded on 32 bits.

last_pattern_is_last_only is a bit flag that, when set to 1, indicates that the last pattern in the list of pattern applies only to the last K samples in the track/traf (K being the number of samples identified in the last pattern). This allows managing the end of the sample grouping differently. It provides a way to address patterns such as A,B,C,A,B,C, A,D where the last run of samples is not part of the repeated samples. When last_pattern_is_last_only is set, the last defined pattern is used to map the last samples of the track/traf, and the rest of the patterns (nb_patterns−1) is repeated a number of times equal to the value of repeat_count over the remaining samples (potentially truncated if exceeding or remaining in-between samples mapped to 0).

repeat_count indicates how many times the listed patterns shall be repeated; a value of 0 indicates there is at most one complete occurrence of the patterns. If last_pattern_is_last_only is set to 0, the list of patterns is repeated repeat_count up to the last sample in the track/traf; if there are less sample than covered by the repeated patterns, the pattern repetition is only valid up to the last sample; otherwise, remaining samples are associated with the default sample group description index, if any, or are not mapped to any group of such grouping_type/grouping_type_parameter. If last_pattern_is_last_only is set to 1, the list of patterns excluding the last entry in that list is repeated repeat_count up to the first sample in the track/traf mapped by the last pattern in the list; if there are less sample than covered by the repeated patterns, the pattern repetition is only valid up to the first sample mapped by the last pattern in the list; otherwise, remaining samples are associated with the default sample group description index, if any, or are not mapped to any group of such grouping_type/grouping_type_parameter.

sample_count_minus_one indicates the number of sample minus one present in this pattern.

is_traf_sgpd indicates that the sample group description index given is an index in the SampleGroupDescriptionBox present in the traf (resp. in the sample table) when set to 1 (resp. 0).

sample group_description_index is an integer that gives the index of the sample group entry which describes the samples in this group. The index ranges from 1 to the number of sample group entries in the SampleGroupDescriptionBox, or takes the value 0 to indicate that this sample is a member of no group of this type.

In an alternative, the parameter is_traf_sgpd is removed and the following rule is applied to sample_group_description_index values: Within the CompactSampleToGroupBox in a movie fragment, the group description indexes (sample_group_description_index) for groups defined within the same fragment start at 0x10001, i.e. the index value 1, with the value 1 in the top 16 bits. Otherwise, for value below 0x10001, the group description index refers to index in the SampleGroupDescriptionBox present in the sample table in the MovieBox. This means there must be fewer than 65536 group definitions for this track and grouping_type in the sample table in the MovieBox.

The indicated pattern will be repeated a number of times equal to repeat_count (0 means pattern occurs only once) when mapping to samples. If the repeated pattern exceeds the number of samples in the track/traf, it is truncated. If it is less, the remaining samples are mapped to default group index or not mapped.

The definition of this CompactSampleToGroupBox currently supports/preserves the default sample grouping mechanism, i.e. samples that are not mapped to any sample group description entry of a given grouping_type are mapped to the sample group description entry provided by the index default_sample_description_index defined in the SampleGroupDescriptionBox of this grouping_type.

This new CompactSampleToGroupBox can be advantageously used, for instance, to signal patterns in temporal sub-layers with the generic Temporal Level sample grouping ('tele') defined in ISO/IEC 14496-12 or with the HEVC Temporal layer sample grouping ('tscl') defined in ISO/IEC 14496-15.

For instance, the Temporal Level sample grouping ('tele') allows association of a given generic temporal level identifier (in this case using sample group description index, the order in index value providing a level of importance) with a flag 'level_independently_decodable' signaling if the level is independently decodable or not. Thus, the client can know which set of samples can be dropped depending on its associated level and flag.

If necessary, the HEVC Temporal layer sample grouping ('tscl') provides even more precise information in the context of HEVC encoding by assigning a given temporal layer (temporalLayerId) with each sample and thus determining whether a sample can be dropped depending on properties associated with a given temporal layer identifier.

According to the second embodiment, the properties of a track within a group that vary over time are defined as sample group entries in SampleGroupDescription box ('sgpd') with a grouping_type equal to the grouping_type of the associated group (EntityToGroupBox@grouping_type and/or TrackGroupTypeBox@grouping_type). In addition, the corresponding SampleToGroup box has the same grouping_type and the grouping_type parameter equals the group identifier (EntityToGroupBox@group_id and/or TrackGroupTypeBox@track_group_id) in order to associate the sample grouping with a given group of tracks.

Within a track, when same parameters are defined in both a TrackGroupTypeBox and a VisualSampleGroupEntry that have the same grouping_type and a track_group_id equal to grouping_type_parameter respectively, the parameter values of the VisualSampleGroupEntry supersede the parameter values of the TrackGroupTypeBox.

For instance, to address the scenario of the FIG. 2a, a new sample group entry SubPictureRegionEntry with a grouping_type equal to 'spco' is defined as follows:

```
aligned(8) class SubPictureRegionEntry extends
VisualSampleGroupEntry('spco') {
    unsigned int(16) track_x;
    unsigned int(16) track_y;
    unsigned int(16) track_width;
    unsigned int(16) track_height;
}
```

This SubPictureRegionEntry provides the coordinates (track_x, track_y) and size (track_width, track_height) that may vary over time of the one or more sub-pictures carried by a track within the spatial composition group described by a SubPictureCompositionGroupBox and/or SubPictureCompositionBox for which EntityToGroupBox@group_id, TrackGroupTypeBox@track_group_id, and SampleToGroup@grouping_type_parameter are equal.

As an alternative, the sample grouping mechanism described above can also be combined with the ComponentToGroupBox to vary along time parameters associated with a component within a group of components. Similarly, within a track, the SampleToGroup box has the same grouping_type and the grouping_type_parameter is equal to the group identifier (ComponentToGroupBox@group_id) in order to associate the sample grouping with a given group of components. When the same parameters are defined in both a ComponentInComponentToGroupBox and a VisualSampleGroupEntry with the same grouping_type in a given track and a component identifier within this group ComponentInComponentToGroupBox@component_id is equal to the track identifier track_ID, and the ComponentInComponentToGroupBox belongs to a group with group_id equal to grouping_type_parameter, then the parameter values of the VisualSampleGroupEntry supersede the parameter values of the Component InComponentToGroupBox.

By defining rules to combine EntityToGroupBox, TrackGroupTypeBox and sample grouping mechanism as described above, it is then possible to vary over time some properties associated with a track within a particular group of tracks.

Figure 14:
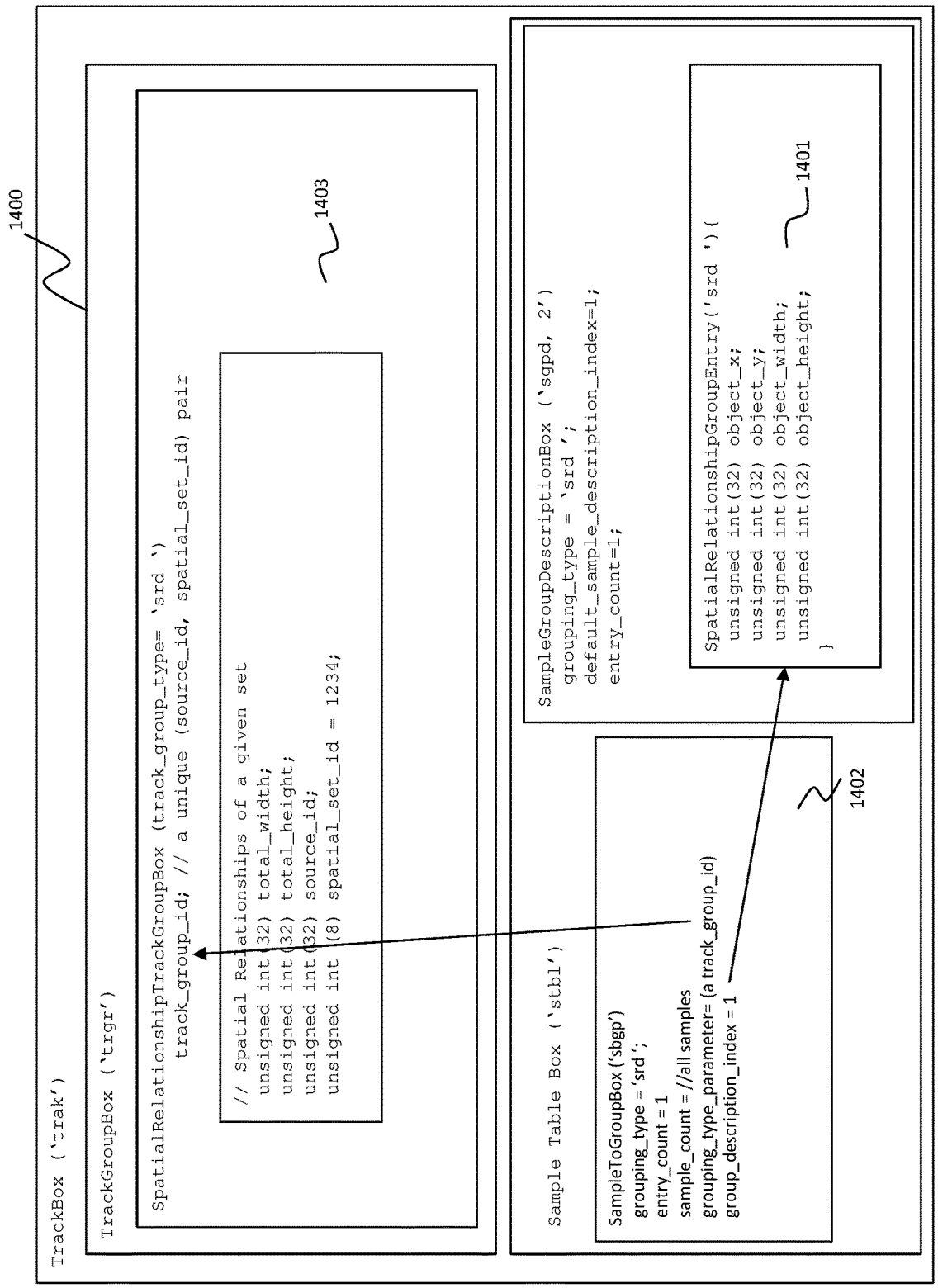

FIG. 14 illustrates another alternative where it is also possible to describe spatial relationship between multiple tracks using only track grouping 1400 and sample grouping 1401 and 1402 by defining a grouping type 'srd' as follows:

The 'srd' track_grouping_type indicates that this track belongs to a group of tracks corresponding to spatial parts of a video. The tracks that have the same value of track_group_id within a TrackGroupTypeBox of track_group_type 'srd' are mapped as being originated from the same source. For example, a very high resolution video may have been split into sub-pictures tracks for complexity reason. Each sub-picture track then conveys its position and sizes in the source video. The 'srd' track group may convey the size of the source video.

The SpatialRelationshipDescriptionBox (or SpatialRelationshipTrackGroupBox 1403, name is here as an example) is defined as follows:

```
aligned(8) class SpatialRelationshipDescriptionBox
    extends TrackGroupTypeBox ('srd ', version, flags)
{
    // the track_group_id is inherited from TrackGroupTypeBox;
    // data specified for particular 'srd ' track_group_type
    if (version == 0) { // single grouping
        unsigned int(32) total_width;
        unsigned int(32) total_height;
    }
    else if (version == 1) { // several sub-groups
        unsigned int(8) num_sub_groups_minus_one;
        for (set=0; set <= num_sub_groups_minus_one; set++) {
            unsigned int(32) sub_group_id;
            unsigned int(32) total_width;
            unsigned int(32) total_height;
        }
    }
}
```

Where total_width specifies, in luma sample units, the width in pixels of the region described by this track group video source. When present, The value of total_width shall be the same in all instances of SpatialRelationshipDescriptionBox with the same value of track_group_id and the same value of sub_group_id.

total_height specifies, in luma sample units, the height of the video source. The value of total_height shall be the same in all instances of SpatialRelationshipDescriptionBox with the same value of track_group_id and the same value of sub_group_id.

In addition, a 'srd' grouping_type for sample grouping is defined for the sub-picture tracks to declare their positions and sizes in a spatial relationship. When version 1 of the SpatialRelationshipDescriptionBox is in use, a version 1 of the SampleToGroupBox shall be used with the grouping_type_parameter value identifying the corresponding 'srd' sub_group_id. When version 0 of the SpatialRelationshipDescriptionBox is in use, either version 0 of the SampleToGroupBox can be used or a version 1 with grouping_type_parameter set to 0.

A specific VisualSampleGroupEntry is defined: SpatialRelationshipGroupEntry ('srd') as follows, and illustrated as 1400 on FIG. 14:

```
class SpatialRelationshipGroupEntry () extends
VisualSampleGroupEntry ('srd ')
{
    unsigned int(16) object_x;
    unsigned int(16) object_y;
    unsigned int(16) object_width;
    unsigned int(16) object_height;
}
```

Where object_x, object_y, object_width, object_height indicate the moving coordinates of the track in the referential defined by total_width and total_height.

'srd' track group or sub-group respectively allows the reconstruction of the full video source or a partial video source. The reconstruction is done as follows:

1) Out of all tracks belonging to the 'srd' track group for version 0 or sub-group for version 1, one track is picked from each alternate group.

2) For each of the picked tracks, the following rules apply:
  a. For each value of i in the range of 0 to object_width−1, inclusive, and for each value of j in the range of 0 to object_height−1, inclusive, the luma sample of the composition picture at luma sample position ((i+track_x) % total_width, (j+track_y) % total_height) is set equal to the luma sample of the sub-picture of this track at luma sample position (i, j).
  b. The chroma components are derived in the same way, according to the chroma sub-sampling used.

The sub-picture rectangles of all tracks belonging to the same 'srd' track group with the same spatail_set_id and belonging to different alternate groups (i.e., having alternate_group equal to 0 or different alternate_group values) shall not overlap and shall not have gaps, such that in the above derivation process for the video source each luma sample position (x, y), where x is in the range of 0 to total_width−1, inclusive, and y is in the range of 0 to total_height−1, inclusive, is traversed exactly once.

In another alternative, the SpatialRelationshipDescriptionBox is defined to match the definition of the Spatial Relationship Descriptor 'SRD' as defined in Dynamic Adaptive Streaming over HTTP (DASH) protocol (ISO/IEC 23009-1 $3^{rd}$ edition) to express spatial relationships between video tracks.

The proposed solution provides direct mapping between spatial relationship descriptions in ISOBMFF and in DASH SRD level as provided in the Table below:

| ISOBMFF parameter | DASH SRD parameter |
|---|---|
| trgr::track_group_id | (not mapped) |
| 'sgpd'::object_x | object_x |
| 'sgpd'::object_y | object_y |
| 'sgpd'::object_width | object_width |
| 'sgpd'::object_height | object_height |
| trgr::'srd '::total_width | total_width |
| trgr::'srd '::total_height | total_height |
| trgr::'srd '::source_id | source_id |
| trgr::'srd '::spatial_set_id | spatial_set_id |

A TrackGroupTypeBox with 'srd' track grouping_type indicates that the track belongs to a group of tracks corresponding to spatial parts of a video. The tracks that have the same value of source_id within a TrackGroupTypeBox of track_group_type 'srd' are mapped as being originated from the same source. For example, a very high resolution video may have been split into sub-pictures tracks for complexity reason. Each sub-picture track then conveys its position and sizes in the source video. The 'srd' track group may convey the size of the source video.

The SpatialRelationshipDescriptionBox is defined as follows:

```
aligned(8) class SpatialRelationshipDescriptionBox
   extends TrackGroupTypeBox('srd ', version, flags)
{
   // the track_group_id is inherited fromTrackGroupTypeBox;
   // data specified for particular 'srd ' track_group_type
   unsigned int(32) total_width;
   unsigned int(32) total_height;
   unsigned int(32) source_id;
   unsigned int(32) spatial_set_id;
}
```

Where
   total_width specifies, in luma sample units, the width in pixels of the region described by this track group. When present, the value of total_width shall be the same in all instances of SpatialRelationshipDescriptionBox with the same value of track_group_id (or source_id) and the same value of spatial set id.
   total_height specifies, in luma sample units, the height of the video source. The value of total_height shall be the same in all instances of SpatialRelationshipDescriptionBox with the same value of track_group_id (or source_id) and the same value of spatial_set_id.
   source_id parameter provides a unique identifier for the source of the content. It implicitly defines a coordinate system associated with this source. All tracks sharing the same source_id value have the same origin and axes orientations.
   spatial_set_id specifies a unique identifier for a subset of tracks that are part of a same 'srd' group with same source_id. The scope of this identifier is global to the file. Value 0 is reserved.

As in the previous alternative, a 'srd' grouping_type for sample grouping is defined for the sub-picture tracks to declare their positions and sizes in a spatial relationship. A version 1 of the SampleToGroupBox shall be used when grouping_type is 'srd' with the grouping_type_parameter value identifying the corresponding 'srd' track_group_id.

Figure 4:
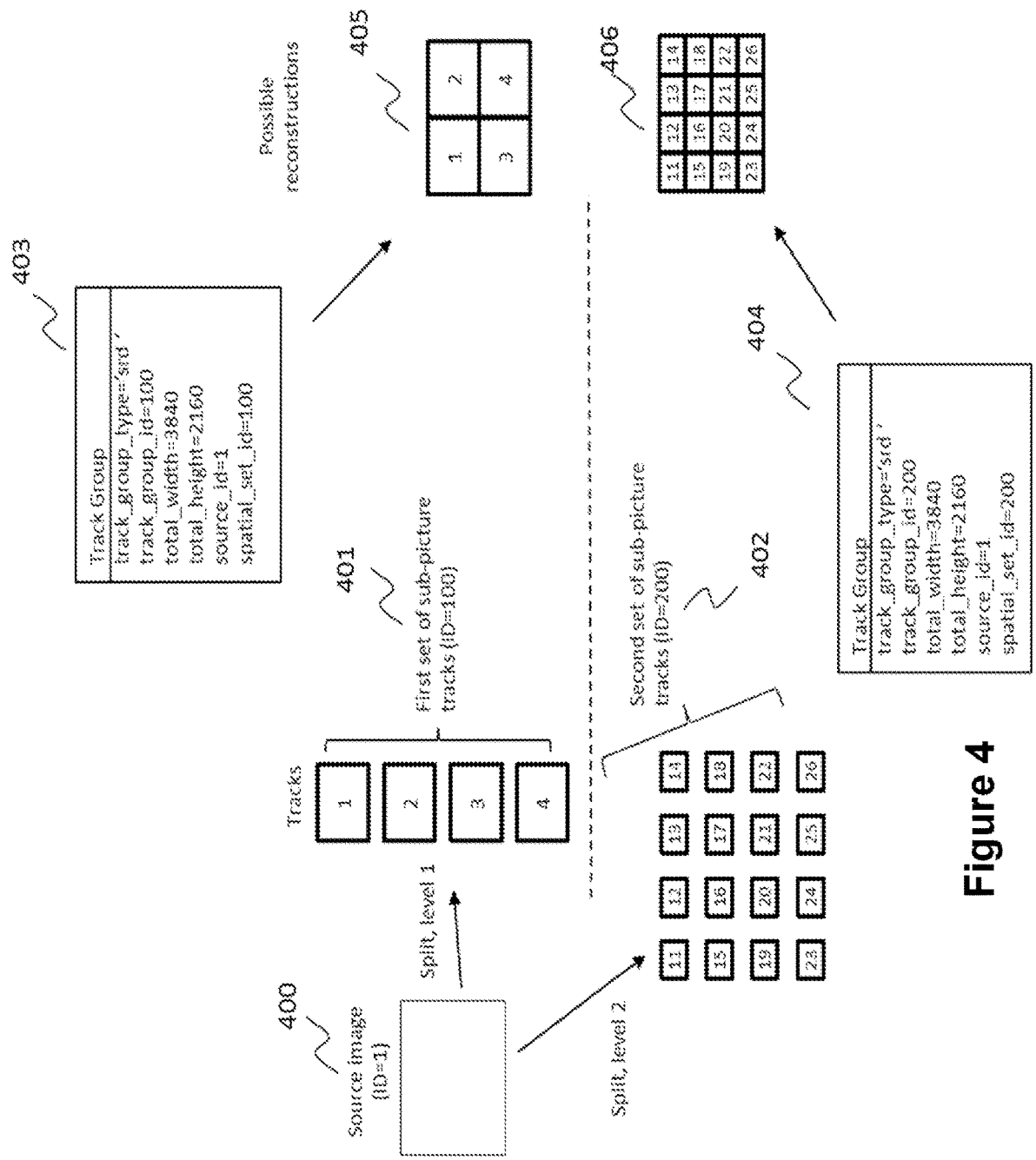
FIGS. 4 to 14 illustrate different examples of use of spatial relationship track groups.

FIG. 4 provides an example of use of the 'srd' track group according to the invention.

Figure 5:
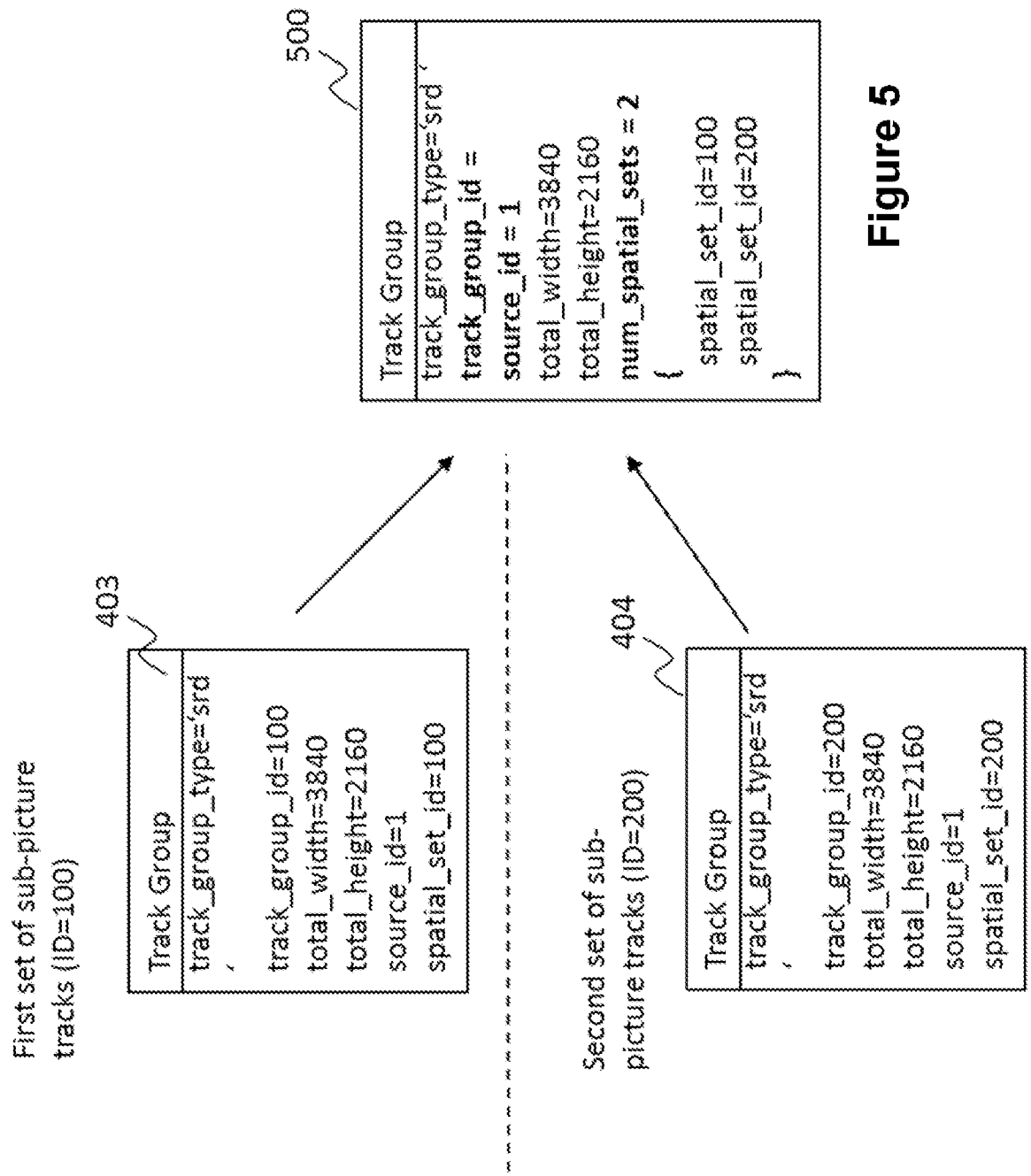

A media file describing a single video 400 is considered. This single video 400, called source video, is split and encoded into two sets of sub-picture tracks 401 and 402. The first set 401 is a division of the source video in 4 sub-picture tracks (Tracks with ID=1 to 4) while the second set 402 is a division of the same source video into 16 sub-picture tracks (Tracks with ID=11 to 26). Two spatial relationships track groups 403 and 404 describe these spatial relationships, one track group per split level. Each track group provides an indication on how tracks can be rendered into the source video 405 or 406. Each track contains a 'trgr' box containing the information present in the "Track Group" boxes 403 or 404. Each track declares, through sample grouping, in a SpatialRelationshipGroup Entry 'srd' (inheriting from VisualSampleGroupEntry) its position and size (x, y, w, h) in the source video 400. The 'srd' track group describes the organization of spatially related tracks. It does not provide composition instructions. It can be seen from FIG. 4 that most of the track group parameters (in 403 or 404) are duplicated in each track group (⅔ of the parameters). However, each track group can unambiguously be referenced through its track_group_id. An alternative embodiment of the example shown in FIG. 4 is shown in FIG. 5.

In this example, to be used with the track group description at moov level, the two initial track groups 403 and 404 can be described in the more compact form 500 (5/12 compaction). Since the track group 500 describes the spatial decomposition of a single source video 400, the track_group_id is set to the source_ID value. Since this single source video is split into distinct sets of sub picture tracks, two spatial_set_ids are defined in this single track group to identify these different sets of sub-picture tracks.

Figure 6:
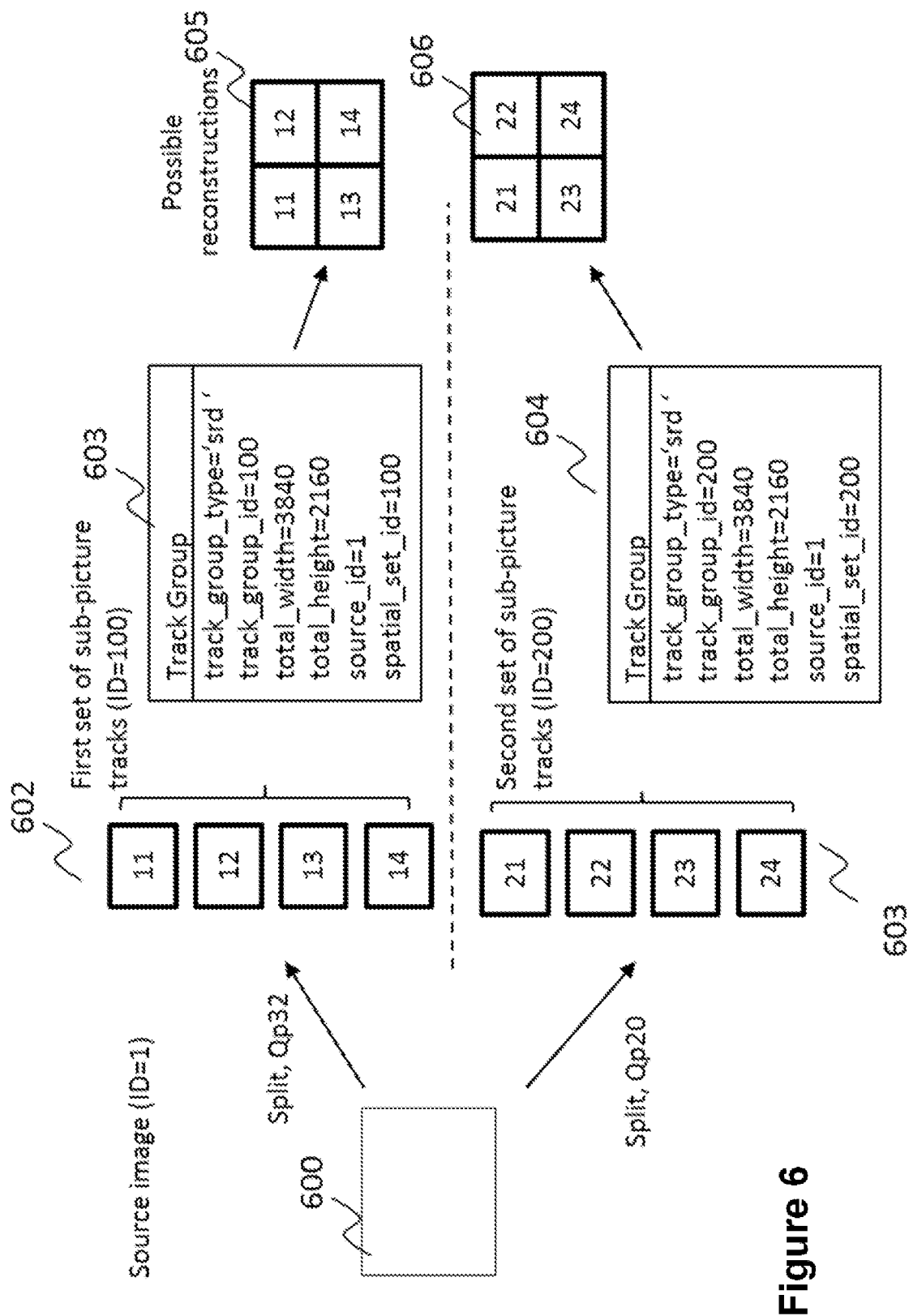

FIG. 6 illustrates another example of use for spatial relationship description in track groups.

A media file describes two alternative versions, in terms of quality, of a single video 600. Each alternative is split into 4 sub-picture tracks 602 and 603. A first set of sub-picture tracks (with IDs=11 to 14) is available in low quality 602, encoded for example in HEVC with a Qp=32, tracks with ID=21 to 24. A second set of sub-picture tracks 603 is available in higher quality, for example Qp=20 in tracks with ID=21 to 24. Two track groups are defined, one per quality level. This leads to similar track groups as in the previous example (⅔ overhead) shown in FIG. 4. The same optimization as in the example of FIG. 5 can be applied.

Figure 7:
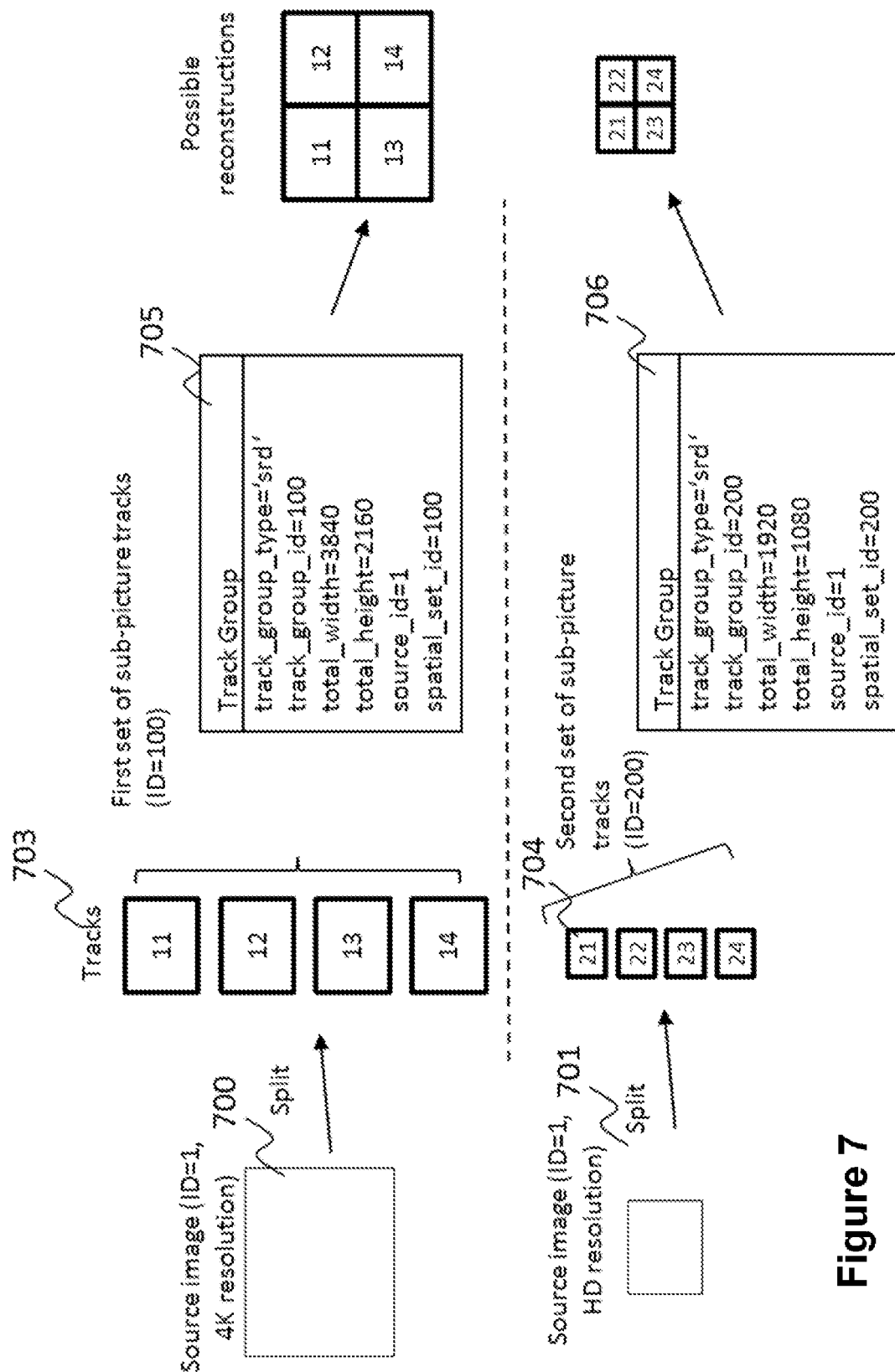

FIG. 7 illustrates another example of use for spatial relationship description in track groups to describe a same source at different resolution levels 700 and 701 of a single video.

Each alternative is split into 4 sub-picture tracks 703 and 704. The 4K resolution level 700 contains the 4 tracks with ID=11 to 14 while the second resolution level 701, for example in HD, contains 4 sub-picture tracks with ID=21 to 24 704. For each resolution level, a track group is declared (705 and 706) with spatial relationships description parameters.

Figure 8:
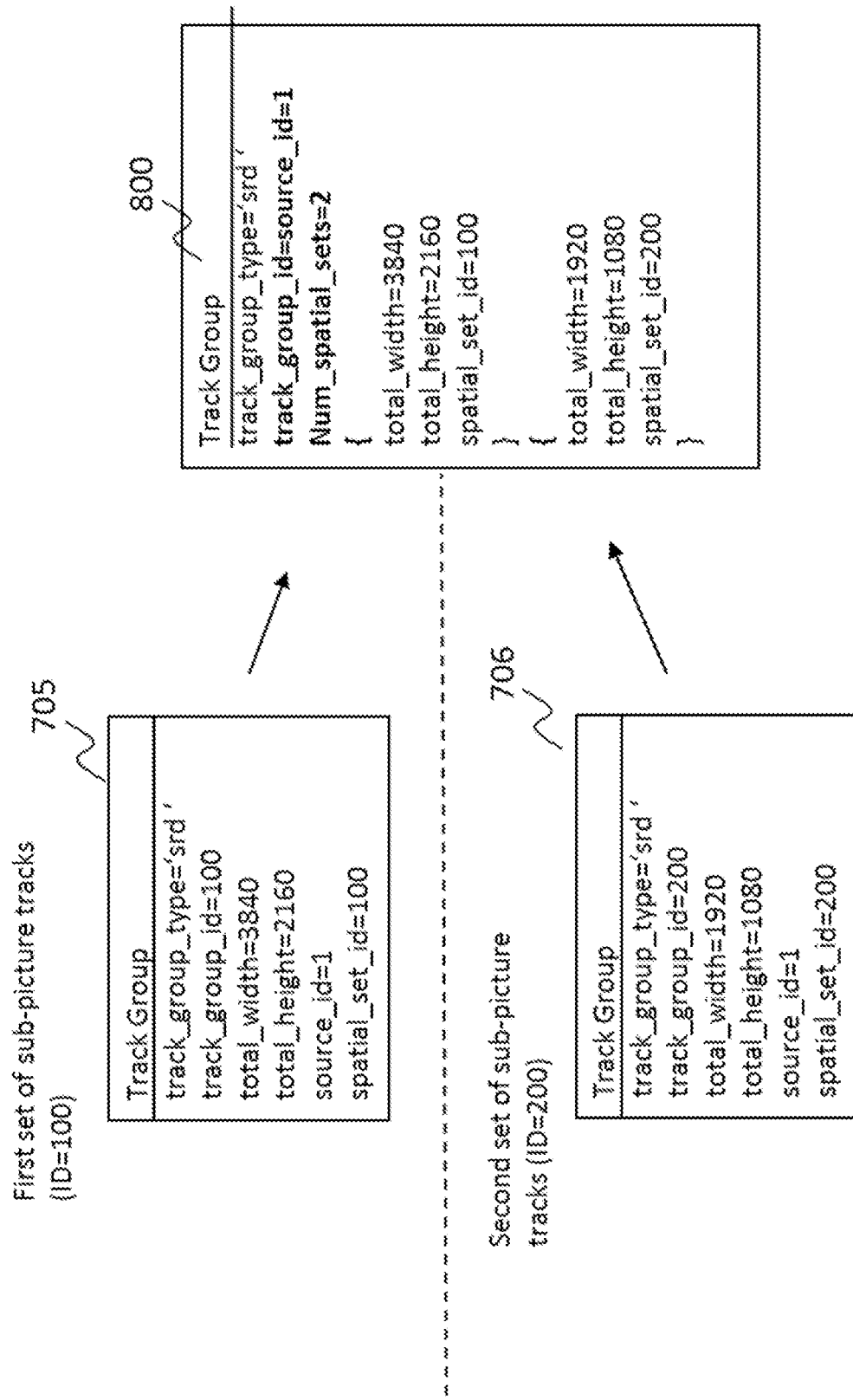

In this example, only ⅓ of the parameters is duplicated. Each track group can be uniquely identified using the track_group_id. The track group description can be 25% more compact by defining a single track group 800 in the Groups List box with two subsets as shown in FIG. 8.

Since the track group describes spatial decomposition of a same video source in terms of content, the track_group_id can be set to the source_ID value.

This leads to a single track group definition in the Groups List box. Since this single source video is split into distinct sets of sub picture tracks 705 and 706, two spatial_set_ids are defined in this single track group 800 to identify the set of sub-picture tracks. The difference with previous examples is that each spatial set defines its own total_width and total_height in addition to its unique identifier.

Figure 9:
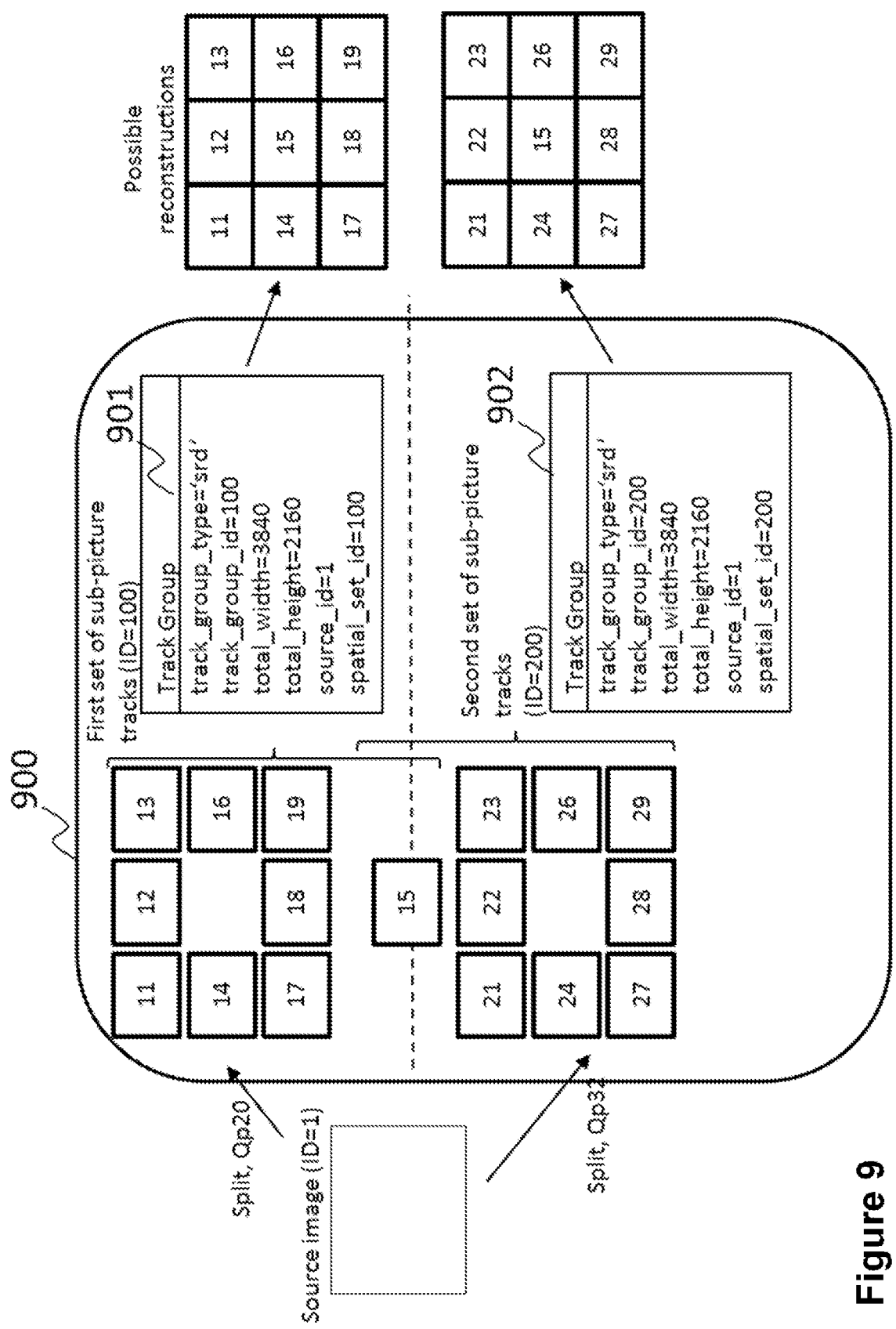

FIG. 9 illustrates a media file 900 describing a single video source encoded at different quality levels.

First, the video is split into 3×3 sub-pictures. The central sub-picture is encoded in high quality and surrounding sub-pictures are encoded each in two quality levels.

This allows adaptation in quality while keeping the central part in high quality (for example a region of interest). This leads to two spatial sets of sub-picture tracks with one sub-picture track, the one for the region of interest with ID=15, being part of these two spatial sets. Tracks with ID=11 to 19 are encoded in high quality. Tracks with ID=21 to 29 are encoded in low quality.

Figure 10:
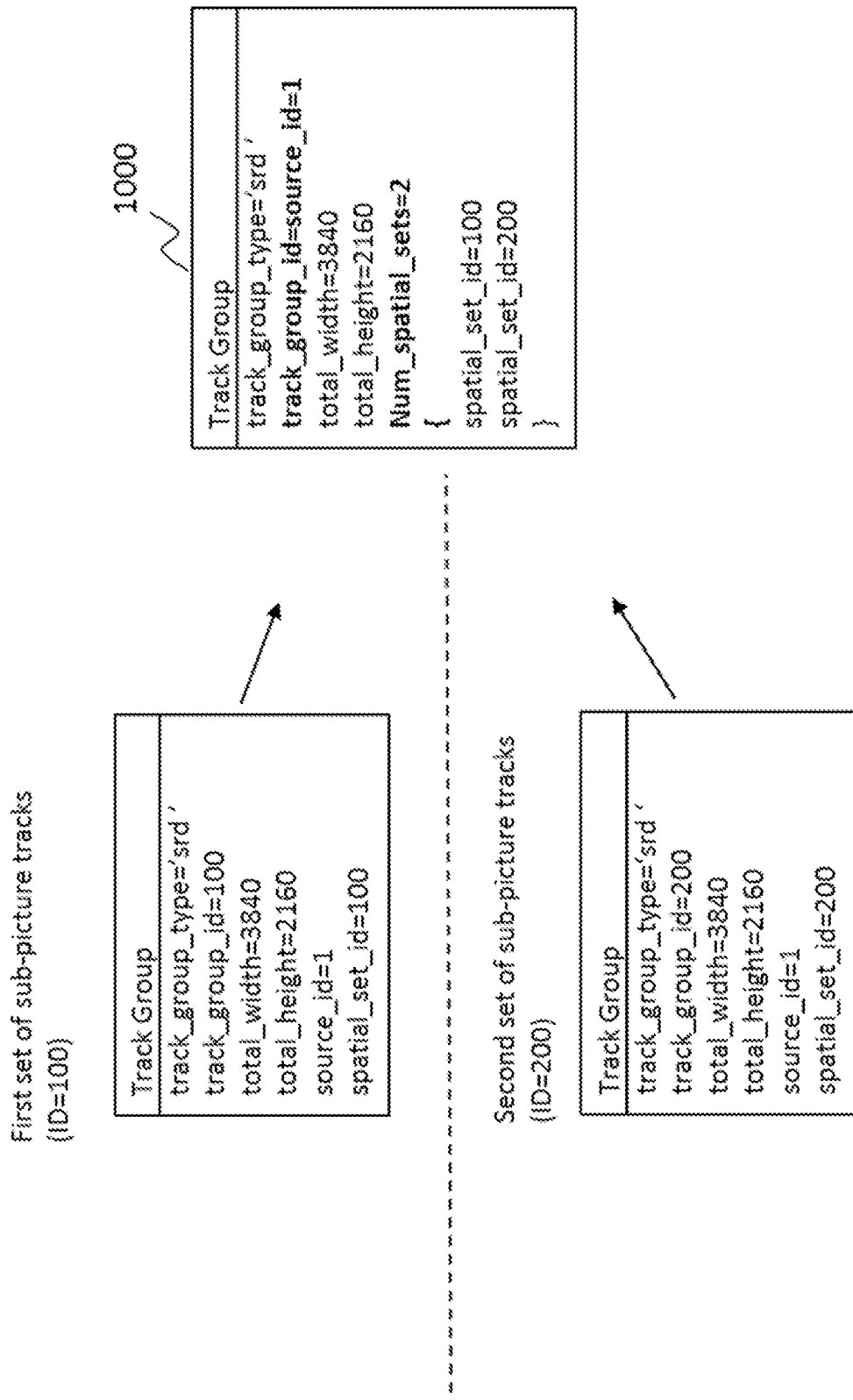

Again, two track groups can be defined, each providing a track group identifier, a source identifier and a spatial set identifier plus the total_width and total_height of the source video. The track with ID=15, is the one shared in the two track groups. It is recalled that sample grouping 'srd' is used to provide the positions and sizes for each track. The mutualized track (ID=15) contains the two 'srd' track group boxes 'trgr', the other tracks contain on track group box: tracks with ID=11 to 14 and 16 to 19 contain the 'srd' track group with ID=100. The track groups with ID=21 to 24 and 16 to 29 contain the 'srd' track group with ID=200. This description 901 and 902 can be optimized into a single track group 1000 in the GroupList Box as shown in FIG. 10.

Figure 11:
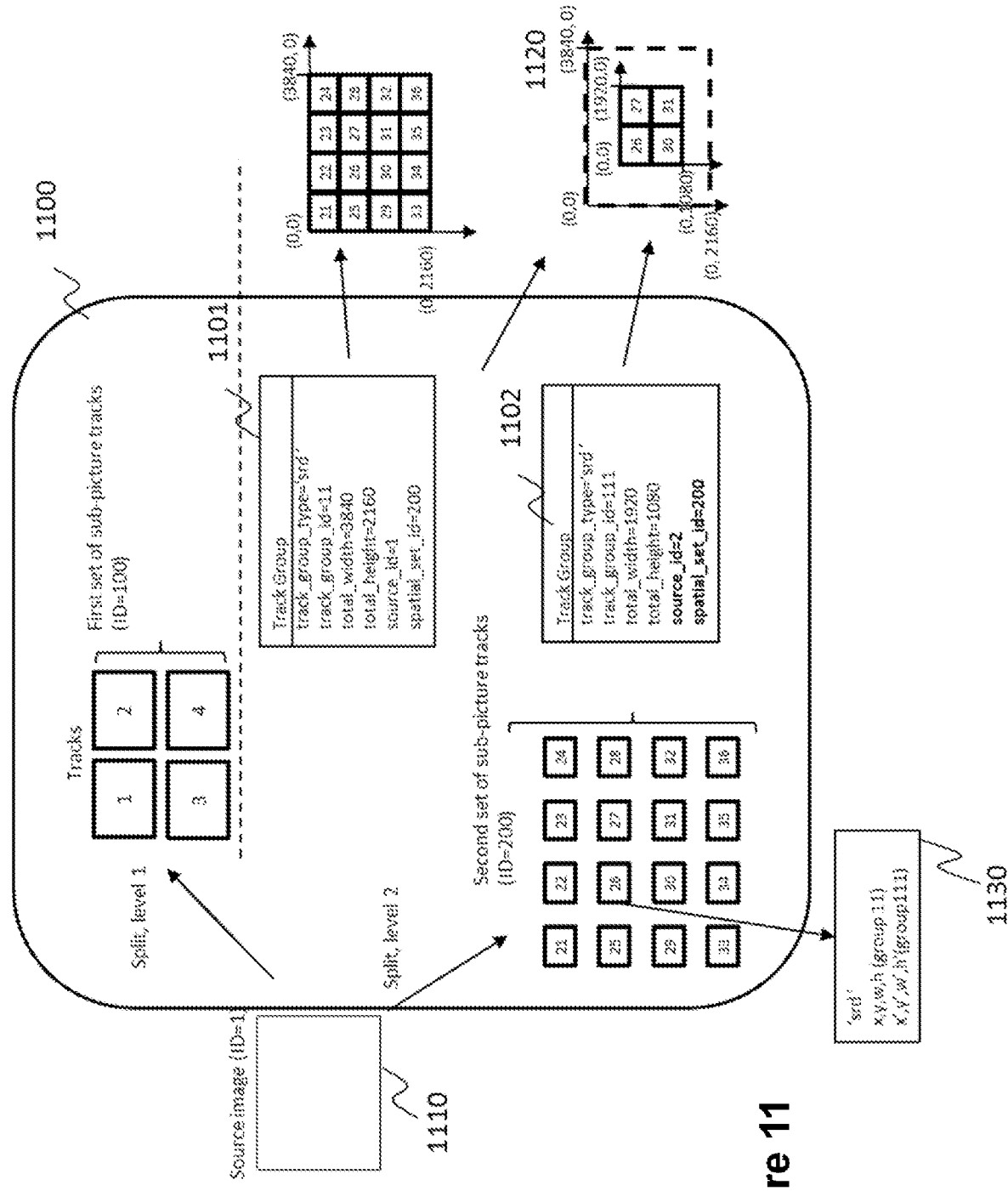

FIG. 11 illustrates another example with a media file 1100 describing a single video. This video is split in two sets of sub-pictures.

Two track groups 1101 and 1102 are defined for the split level 2 decomposition level. While the track group 1101 provides the spatial relationships for the sub-picture tracks in the source video, the track group 1102 describes spatial relationships for a partial reconstruction 1120 (tracks with ID 26, 27, 30 and 31 for example) of this source video 1110 from the same set of sub-picture tracks (track group with ID=111). This track group introduces a new origin, as such a new source_id value. The spatial_set_id indicates that it provides the same set of sub-picture tracks as in group 1101. Only a subset of sub-picture tracks is used here. The tracks with ID 26, 27, 30 and 31 are part of both groups: they have to define different position and sizes in the different source_id, i.e. referential. For this purpose, each combination of position and size parameters has to be associated with a track_group_id (in 1130). In the above example it could be either the track_group_id or the source_id. This is done with the SampleToGroupBox::grouping_type_parameter. As many SampleToGroupBox of grouping_type 'srd' as track groups are defined, as well there are as many entries of grouping_type 'srd' in the SampleGroupDescriptionBox as track groups. Each SampleToGroup of type 'srd' maps to an entry in the corresponding 'sgpd' and in a given SampleToGroupBox, the grouping_type_parameter provides the mapping between the (x,y,w,h) and the track group. For example, the track with ID=26 has x,y,w,h parameters in the group with track_group_id=11 while it has x_prime, y_prime, w_prime, h_prime in the group with track_group_id=111.

Figure 12:
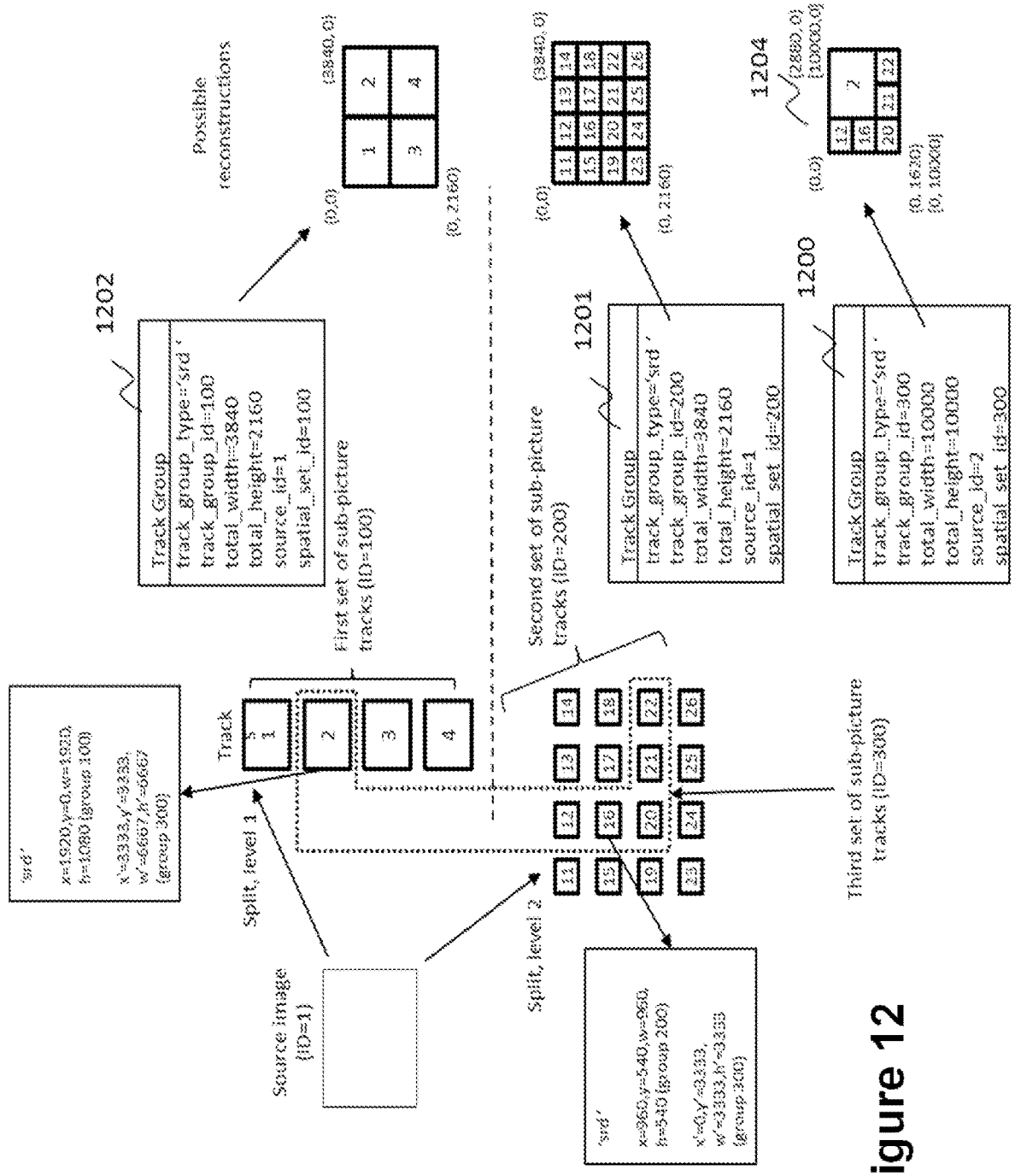

FIG. 12 illustrates an example of 'srd' track group where spatial relationship description parameters are expressed in normalized coordinates, instead of luma sample units.

The same Track Groups as shown in FIG. 4 are presented 1201 and 1202 in the file together with a third Track Group 1200 with track_group_id=300 that allows to produce a partial reconstruction fully covering a new source with source_id=2. The tracks location of the partial reconstruction is here expressed in normalized coordinates: 'w' and 'h' expressed in the 'srd' box are not the same as the ones expressed in pixels in object_width and object_height. In such a case, the normalized ratio is the (rounded) ratio between the value of 'w' and the track_width and between h and the track_height present in the track header. These ratios shall be equal. The total_width or total_height values in luma samples for the group are respectively deduced by multiplying the ratio with the normalize total_width and total_height declared in the track group 1200. In the example shown in FIG. 12, the partial reconstruction 1204 also combines tracks with different spatial shapes (from two different splitting levels), but with the same spatial resolution (in terms of spatial sampling).

Figure 13:
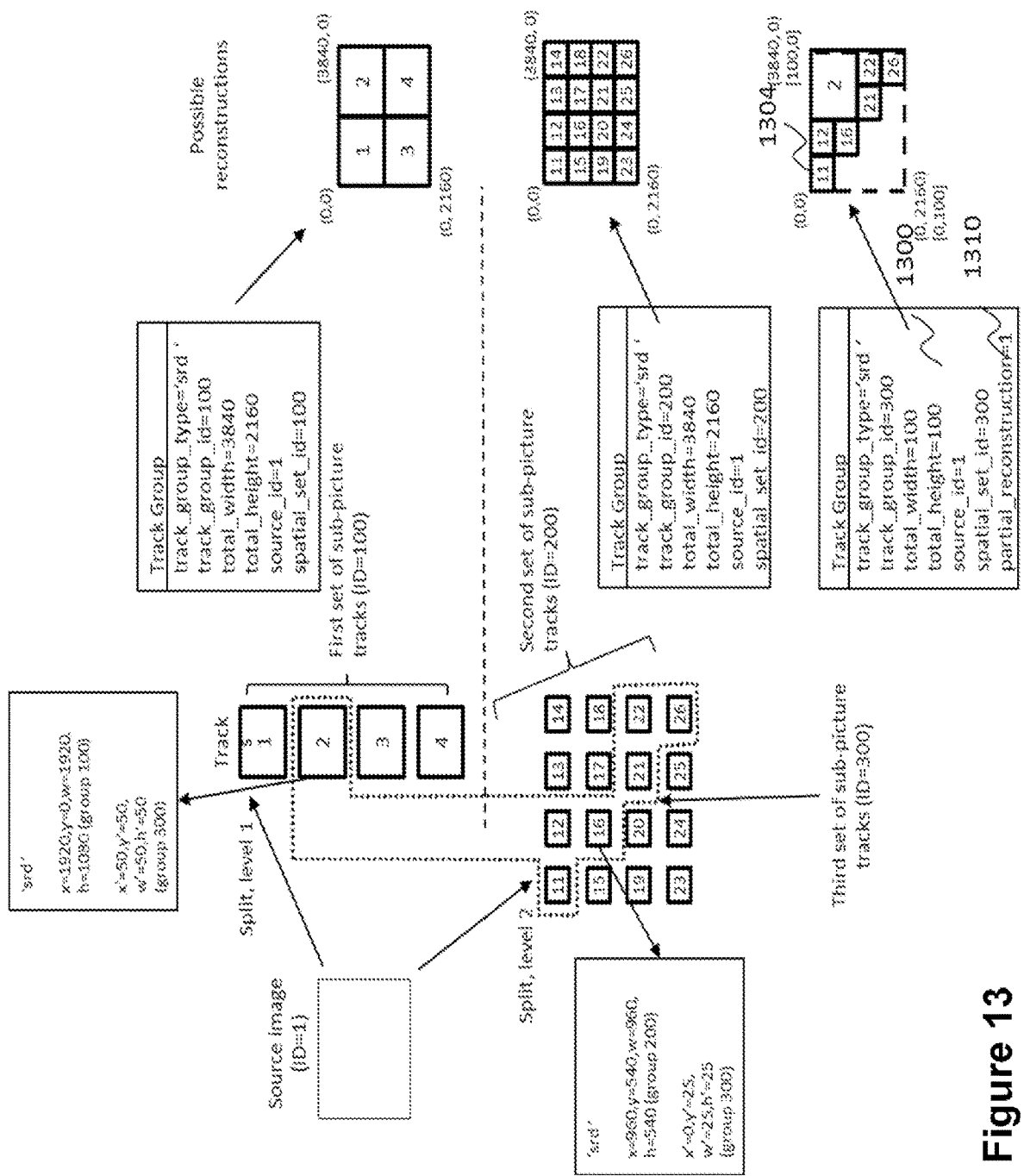

FIG. 13 illustrates the track group 1300 with track_group_id=300 is also expressed with normalized coordinates (as shown in FIG. 12). In this example, the third track group 1300 uses the same source as the two other track groups.

It indicates that the rendering shall be performed in the same referential as the source (same origin, same dimensions). However, a partial_reconstruction flag 1310 equal to 1 is used to signal that the track group contains only a sub-part of the source: the source will be only partially rendered. This additional parameter is an indication for media players. It can be a text description of the shape, for example: "rectangle", "square", "triangle", etc.

In the examples shown in FIGS. 4 to 13, the x corresponds to the object_x, y corresponds to object_y and w and h respectively to object_width and object_height from the SpatialRelationshipGroupEntry.

In an alternative embodiment, two types of spatial relationships descriptions are distinguished: descriptive and prescriptive. Each type of spatial relationships description has a reserved unique four character code that can be used in track_grouping_type. Having different track_grouping_types allows describing spatial relationships from the original source (descriptive) or a spatial composition (prescriptive). Making this distinction allows a lighter spatial relationship description for the composition where the source_id parameter may not be needed anymore since the composition may result in a different video from the original source video.

In another embodiment, the track group for spatial relationship descriptions does not contain a spatial_set_id. In this embodiment, the spatial_set_id value is the same as the track_group_id value. When preparing the content for tile-based or region-of-interest streaming (for example DASH), these spatial relationships can be exposed in a streaming manifest (for example a DASH Media Presentation Description with SRD descriptor) or in a Session Description Protocol file, the spatial_set_id is set to the value of the track_group_id. As well, when the track properties are dynamic and described with sample group with grouping_type='srd', the grouping_type parameter uses this track_group_id.

In another embodiment, the SpatialRelationGroupEntry may not contain sizes of the sub-picture tracks (w, h) but only its positions (x and y). In this case, the track width and height in the track header shall be considered. In this case, the coordinates shall be considered expressed in luma sample units, not in arbitrary or normalized units.

The SpatialRelationshipDescriptionGroupEntry and the 'srd' track can also be described in 'trgr' box or alternatively in the Groups List box ('grpl')). When the 'srd' track group is static, both 'srd' track group and SpatialRelationshipGroupEntry 'srd' may be merged respectively as track property in one entry of the GroupList Box. When the 'srd' track group is dynamic, only the parameters from the track group are moved to one entry in the GroupList Box while the SpatialDescriptionGroupEntry remains in the sub-picture track.

According to a third embodiment, the Groups List box ('grpl')) can be defined in a fragment-level Meta Box ('meta') in addition to the file-level Meta Box ('meta'), i.e. an EntityToGroupBox can be redefined across ISOBMFF fragments along time.

An EntityToGroupBox defined in a fragment (under a 'moof' box) supersedes any EntityToGroupBox with same grouping_type and same group_id previously defined. It also invalidates all previous track group definitions with same grouping_type and track_group_id equal to group_id in all tracks.

By defining an EntityToGroupBox in a fragment, it is possible to proceed to a complete reset of the definition of a group of tracks (including common properties) with a given grouping_type and group_id with the consequence that all properties associated with a track belonging to this updated group of tracks must be redefined at fragment level for each track that composes this group of tracks.

To allow this, it is proposed to extend track group by authorizing track group definition at fragment level as follows:

Box Type: 'trgr'
Container:TrackBox('trak') or TrackFragmentBox('traf')
Mandatory: No
Quantity: Zero or one
aligned(8) class TrackGroupBox extends Box('trgr') {
}

Where this box contains the set of TrackGroupTypeBox describing the set of groups of tracks the track fragment is belonging to.

The TrackGroupTypeBox is defined as in previous embodiments.

This is useful for updating parameters associated with a track within a track group along time at fragment granularity. That provides an intermediate granularity for parameters between the static definition at track level (in 'track' box) and the full dynamicity at sample level using sample grouping mechanism as described previously.

When this TrackGroupBox ('trgr') is defined in a TrackFragmentBox ('traf'), its content (i.e. the set of TrackGroupTypeBox) supersedes all indications of group of tracks associated with this track in a previous fragment or in the corresponding TrackBox ('trak') (i.e. with same track_ID). If the container TrackGroupBox ('trgr') is empty in a TrackFragmentBox Oran, then the fragment does not belong to any group. If the TrackGroupBox ('trgr') is not defined in a TrackFragmentBox ('traf'), track group definitions associated with this track in the 'moov' box (i.e. 'trgr' box defined in associated 'trak' box), if any, apply.

The TrackGroupBox ('trgr') defined in a TrackFragmentBox ('traf') enables indication of groups of tracks valid for a given track fragment. The scope of the Track Group Box ('trgr') in a track fragment is limited to the encompassing track fragment to cope with trick modes and seek management where some fragments may be lost or not requested by the client. In such a case, the client must not rely on information that is only defined in a previous fragment.

This enables a track to be added or removed from a track group along time.

As an alternative, the TrackGroupBox ('trgr') as defined above can also be combined with the ComponentToGroupBox to vary along time the set of groups which the track belongs to and possibly the parameters associated with the track within a given group. Similarly, when a TrackGroupBoxbox ('trgr') is defined in a TrackFragmentBox ('traf'), its content (i.e. the set of TrackGroupTypeBox) supersedes all information defined by any Component InComponentToGroupBox having a component_id equal to the track fragment's track_ID.

According to a fourth embodiment, one or more additional flags can be defined in any one of the previously defined boxes EntityToGroupBox, TrackGroupTypeBox, ComponentToGroupBox and Component InComponentToGroupBox to signal whether the number of members of a group and/or the properties shared by the group and/or the properties associated with an entity or a component within a group are static or dynamic along time. This one or more flags allow the client parser to be signaled in the case where it should be prepared to parse further sub-level track group boxes in track fragments or sample grouping boxes (for instance CompactSampleToGroupBox or SampleToGroup, and SampleGroupDescriptionBox) to determine all existing groups and associated properties along time or if all group-related information is statically defined at the beginning of the presentation.

For instance, a 1-bit flag (e.g. static_grouping_flag) in EntityToGroupBox or Component ToGroupBox signals when set to 1 that the group of components or entities is static for the whole multimedia presentation duration and when set to 0 that the group of components or entities may change at track fragment level (e.g. using track grouping mechanism or sample grouping at fragment level).

In another example, a 1-bit flag (e.g. static_properties_flag) in TrackGroupTypeBox or ComponentIn- ComponentToGroupBox signals when set to 1 that the properties defined in the embedding box (respectively TrackGroupTypeBox or ComponentInComponentToGroupBox) remain the same for the whole duration of the presentation (if defined in a file-level boxes, e.g. 'moov', 'meta' boxes) or for the duration of the fragment (if defined in a fragment-level box, e.g. 'moof', 'meta' or 'traf' boxes), and when set to 0 that the properties may change using either track grouping or sample grouping mechanisms at fragment level.

In an alternative of the previous examples, a 2-bit flag (e.g. dynamic_properties_flag) may be used to precise whether the dynamicity is implemented using either track grouping or sample grouping mechanisms at fragment level, or possibly both:

dynamic_properties_flag=0, means no dynamicity,
dynamic_properties_flag=1, means dynamicity at fragment granularity using track grouping at fragment level,
dynamic_properties_flag=2, means dynamicity at sample granularity using sample grouping mechanism,
dynamic_properties_flag=3, means dynamicity possibly at both fragment and sample granularity using track grouping and/or sample grouping mechanism.

The use of above flags simultaneously may allow defining a hierachy of dynamicity as follows:

the flag in EntityToGroupBox or ComponentToGroupBox may signal whether it exists a dynamicity at track fragment level, and
the flag in TrackGroupTypeBox at fragment level may signal whether it exists a dynamicity at sample level within the given track fragment.

In an alternative embodiment, it is possible to use multiple instances of above 1-bit or 2-bit flags to signal the dynamicity of following information separately:

Whether the list of components composing the group is dynamic or static;
Whether the set of common properties associated with the group is dynamic or static;
Whether the set of properties associated with a given component in the group is dynamic or static.

In an alternative, optionally, another parameter (e.g. static_group_id) can be defined in any one of the previously defined boxes EntityToGroupBox, TrackGroupTypeBox, ComponentToGroupBox, and ComponentInComponentToGroupBox to signal whether the content of the box has really changed compared to a previous instance of the same box with the same grouping_type or track_group_type and group_id or track_group_id. For each of above boxes, this static group_id is increased each time a new instance of above boxes is defined with same group_id or track_group_id and grouping_type or track_grouping_type pair respectively, and the box defines different properties or list of components compared to a previous instance. This parameter static group_id represents a kind of version number. The box can reuse a previous static group_id parameter value when the box content (i.e. set of grouped components and/or properties) is exactly the same as previously defined. This parameter allows the client parser to know if something has changed before parsing the whole box.

FIG. 3 is a schematic block diagram of a computing device 300 for implementation of one or more embodiments of the invention. The computing device 300 may be a device such as a micro-computer, a workstation or a light portable device. The computing device 300 comprises a communication bus connected to:

a central processing unit (CPU) 301, such as a microprocessor;
a random access memory (RAM) 302 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
a read only memory (ROM) 303 for storing computer programs for implementing embodiments of the invention;
a network interface 304 that is, in turn, typically connected to a communication network over which digital data to be processed are transmitted or received. The network interface 304 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 301;
a user interface (UI) 305 for receiving inputs from a user or to display information to a user;
a hard disk (HD) 306;
an I/O module 307 for receiving/sending data from/to external devices such as a video source or display.

The executable code may be stored either in read only memory 303, on the hard disk 306 or on a removable digital medium such as for example a disk. According to a variant, the executable code of the programs can be received by means of a communication network, via the network interface 304, in order to be stored in one of the storage means of the communication device 300, such as the hard disk 306, before being executed.

The central processing unit 301 is adapted to control and direct the execution of the instructions or portions of software code of the program or programs according to embodiments of the invention, which instructions are stored in one of the aforementioned storage means. After powering on, the CPU 301 is capable of executing instructions from main RAM memory 302 relating to a software application after those instructions have been loaded from the program ROM 303 or the hard-disc (HD) 306 for example. Such a software application, when executed by the CPU 301, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for parsing one or more media files based on timed media data, the method comprising:
    obtaining tracks from the one or more media files, each track comprising a timed sequence of samples, each sample comprising at least a part of a timed unit of the timed media data;
    obtaining from the one or more media files descriptive metadata associated with the obtained tracks; and
    obtaining, from the one or more media files, media data based on at least one of the obtained tracks and on the descriptive metadata;
    wherein the descriptive metadata comprises a track grouping structure including a group identifier and defining a group of tracks among the obtained tracks,
    wherein the descriptive metadata further comprises a sample grouping structure including a grouping type parameter and associating a first set of properties with one or more samples of one of the obtained tracks, and
    wherein, when the value of the grouping type parameter is equal to the value of the group identifier, the first set of properties are properties of the one or more samples of the one obtained track only in the group of tracks defined by the track grouping structure identified by the group identifier.

2. The method according to claim 1, wherein the sample grouping structure is a Sample ToGroupBox and at least a part of the plurality of sets of properties is included in a SampleGroupDescriptionBox in the descriptive metadata.

3. The method according to claim 1, wherein the track grouping structure is a TrackGroupTypeBox and at least one TrackGroupTypeBox is obtained and associated with each obtained track belonging to the group of tracks.

4. The method according to claim 3, wherein obtained tracks associated with a TrackGroupTypeBox comprising a same group identifier and a same grouping type are belonging to the same group of tracks.

5. The method according to claim 1, wherein timed units of timed media data are partitioned so that a sample comprises a part of timed unit.

6. The method according to claim 5, wherein at least one group of tracks is a composition group for composing parts of timed units carried by samples of the different obtained tracks belonging to the group of tracks.

7. The method according to claim 1, wherein the list of existing groups of tracks and properties shared by the tracks of each group are defined at file level or movie level in the descriptive metadata.

8. The method according to claim 7, wherein for at least one track, further properties specific to this track are defined at track level in the descriptive metadata.

9. The method according to claim 8, wherein each group of tracks defined at file level or movie level is associated with a group of tracks defined at track level by the same unique group identifier.

10. The method according to claim 9, wherein each property can take different values, and wherein the value of each property specific to a track varies over time.

11. The method according to claim 10, wherein the value of each property specific to the track is defined for one or more samples within the track.

12. The method according to claim 11, wherein the descriptive metadata further comprises at least one box describing the samples within the tracks belonging to the same group of tracks, the at least one box defining the different possible values that can take the specific properties over time.

13. The method according to claim 12, wherein the at least one box indicates a grouping type associated with semantics describing at least one criterion used to form a group of samples.

14. The method according to claim 12, wherein the values taken by the properties of consecutive samples follow a repeated pattern and the at least one box defines the repeated pattern itself and its repetition.

15. The method according to claim 1, wherein each property can take different values, and wherein the descriptive metadata are fragmented so that the at least one group of tracks is defined at fragment level, and the set of tracks composing a group of tracks varies over time.

16. The method according to claim 1, wherein the track grouping structure further includes a first grouping type, the sample grouping structure further includes a second grouping type, and the first set of properties are properties of the one or more samples of the one created track in the group of tracks defined by the track grouping structure identified by the group identifier when further the first grouping type is equal to the second grouping type.

17. The method according to claim 1, wherein the track grouping structure further includes a second set of properties applying to the group of tracks defined by the track grouping structure.

18. The method according to claim 17, wherein property values in the first set of properties supersedes properties values from the second set of properties.

19. A non-transitory computer-readable storage medium storing instructions of a computer program for implementing a method according to claim 1.

20. A device for parsing one or more media files based on timed media data, the timed media data comprising samples, the device comprising:
    at least one memory storing instructions, and
    at least one processor executing the instructions causing the device to:
    obtain tracks from the one or more media files, each track comprising a timed sequence of samples, each sample comprising at least a part of a timed unit of the timed media data;
    obtain from the one or more media files descriptive metadata associated with the obtained tracks; and
    obtain, from the one or more media files, media data based on at least one of the obtained tracks and on the descriptive metadata;
    wherein the descriptive metadata comprises a track grouping structure including a group identifier and defining a group of tracks among the obtained tracks,
    wherein the descriptive metadata further comprises a sample grouping structure including a grouping type parameter and associating a first set of properties with one or more samples of one of the obtained tracks, and wherein, when the value of the grouping type parameter is equal to the value of the group identifier, the first set of properties are properties of the one or more samples of the one obtained track only in the group of tracks defined by the track grouping structure identified by the group identifier.

\* \* \* \* \*